United States Patent [19]

Romano et al.

[11] Patent Number: 5,586,306
[45] Date of Patent: Dec. 17, 1996

[54] INTEGRATED CIRCUIT SERVO SYSTEM CONTROL FOR COMPUTER MASS STORAGE DEVICE WITH DISTRIBUTED CONTROL FUNCTIONALITY TO REDUCE TRANSPORT DELAY

[75] Inventors: Paul M. Romano; Larry D. King, both of Boulder, Colo.; John S. Geldman, Los Gatos; Bhupendra K. Ahuja, Fremont, both of Calif.; Palaksha Setty, Austin, Tex.; Petro Estakhri, Pleasanton, Calif.; Son Ho, Sunnyvale, Calif.; Phuc Tran; Maryam Imam, both of Fremont, Calif.

[73] Assignee: Cirrus Logic, Inc., Fremont, Calif.

[21] Appl. No.: 448,098

[22] Filed: May 23, 1995

Related U.S. Application Data

[63] Continuation of Ser. No. 71,773, Jun. 4, 1993, abandoned.

[51] Int. Cl.⁶ ............................................. G06F 3/00
[52] U.S. Cl. .................. 395/500; 395/439; 360/78.12; 360/78.04; 364/DIG. 1; 364/DIG. 2
[58] Field of Search .................................. 395/500, 439; 360/78.12, 78.04, 78.14

[56] References Cited

U.S. PATENT DOCUMENTS

| | | | |
|---|---|---|---|
| 4,783,705 | 11/1988 | Moon et al. | 360/77 |
| 4,814,909 | 3/1989 | Brown et al. | 360/78.07 |
| 4,896,240 | 1/1990 | Moriya et al. | 360/135 |
| 4,933,795 | 6/1990 | Nigam | 360/121 |
| 4,982,296 | 1/1991 | Brown et al. | 360/77.03 |
| 5,111,349 | 5/1992 | Moon | 360/78.07 |
| 5,170,299 | 12/1992 | Moon | 360/77.08 |
| 5,187,619 | 2/1993 | Sidman | 360/77.08 |
| 5,255,136 | 10/1993 | Machado et al. | 360/77.02 |
| 5,261,058 | 11/1993 | Squires et al. | 395/275 |
| 5,280,603 | 1/1994 | Jeppson et al. | 395/425 |
| 5,291,355 | 3/1994 | Hatch et al. | 360/97.01 |

OTHER PUBLICATIONS

Design of an Analog-8-Bit 2-Channel I/O ASIC for disk drive control Applications, 1989 IEEE, by Philip Quinlan, pp. 11.2.1–11.2.4.

Design and Operation of a fully Integrated BiC/DMOS Head-Actuator PIC for Computer Hard-Disk Drive by Williams et al IEEE 1991 publication, pp.–1590–1599.

*Primary Examiner*—Krisna Lim
*Assistant Examiner*—Zarni Maung

[57] ABSTRACT

An integrated circuit controls the low level, electromechanical functionality of a computer mass storage device, such as a magnetic disk drive incorporating a spindle motor for rotatably controlling a disk and an actuator for positioning at least one read/write head with respect to the disk, to read or write encoded data configured in information data sectors and to sense encoded data of servo data sectors. A servo subsystem is coupled to an output of the read/write head for detecting the servo data sectors and providing a control signal in response thereto. An analog-to-digital subsystem is also coupled to an output of the read/write head and is operative in response to the servo subsystem control signal for converting the encoded data of the servo data sectors to digital transducer position information representative of a position of the read/write head with respect to the data tracks. A data processing subsystem is coupled to the analog-to-digital subsystem for processing the digital transducer position information and providing digital motion control signals in response thereto. A digital-to-analog subsystem is coupled to the data processing subsystem for providing analog control signals to the spindle motor and the actuator in response to the digital motion control signals.

47 Claims, 9 Drawing Sheets

Fig_1

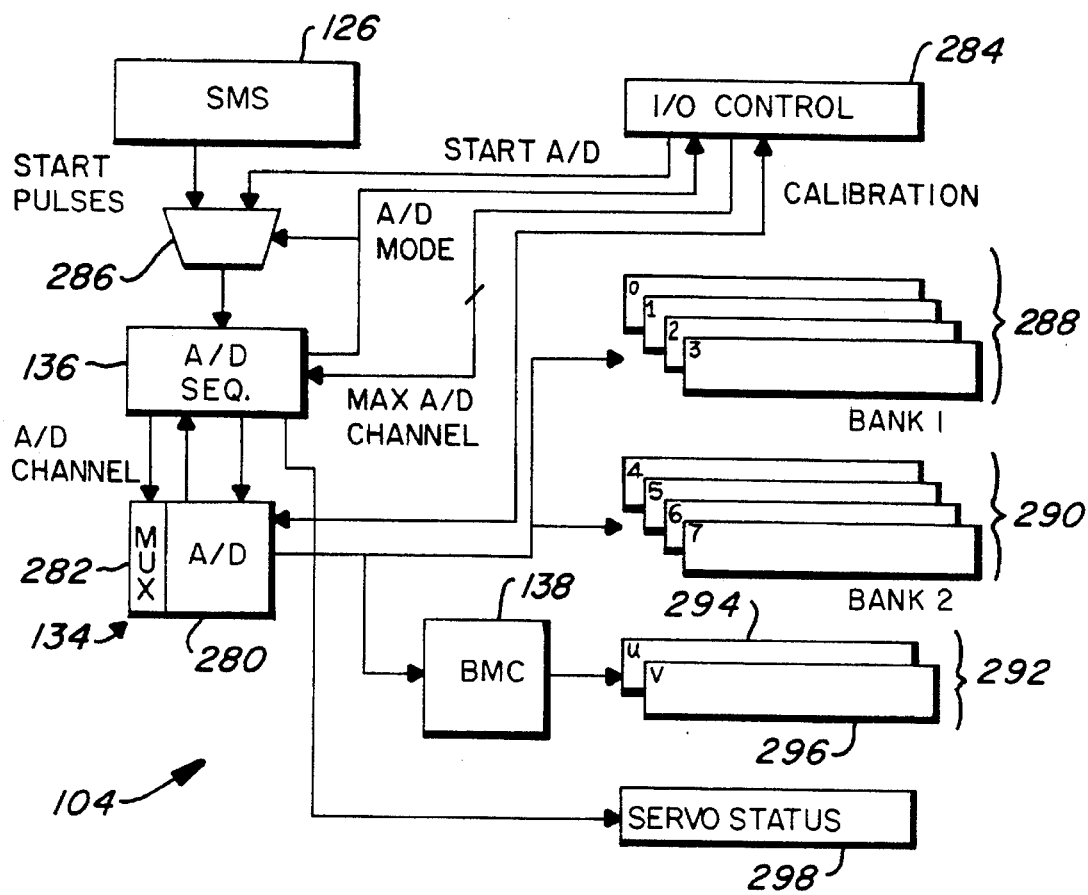
Fig_6
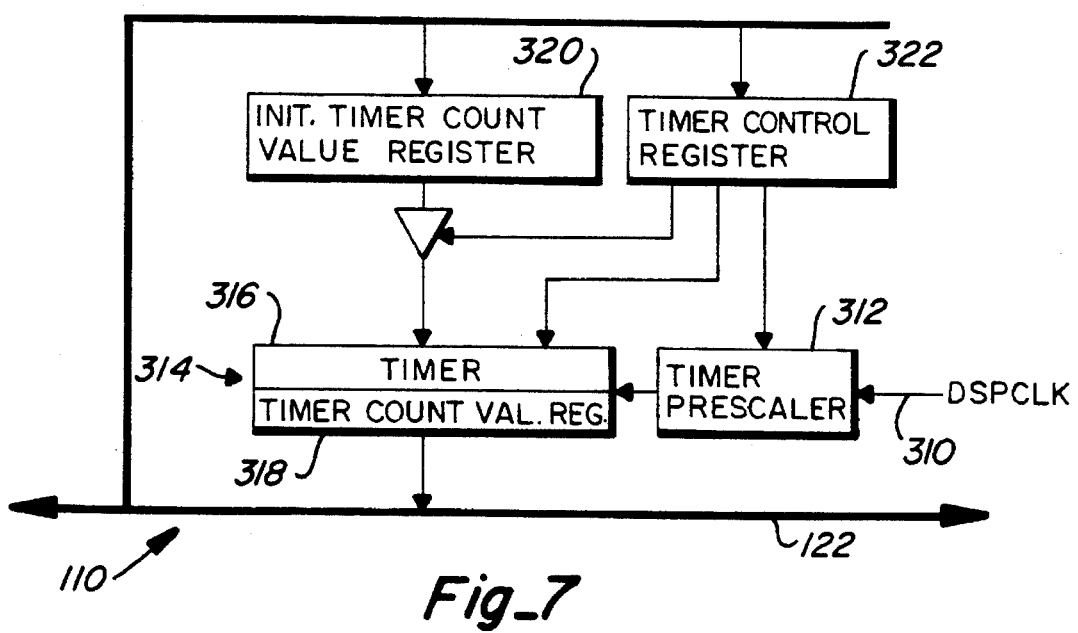
Fig_7

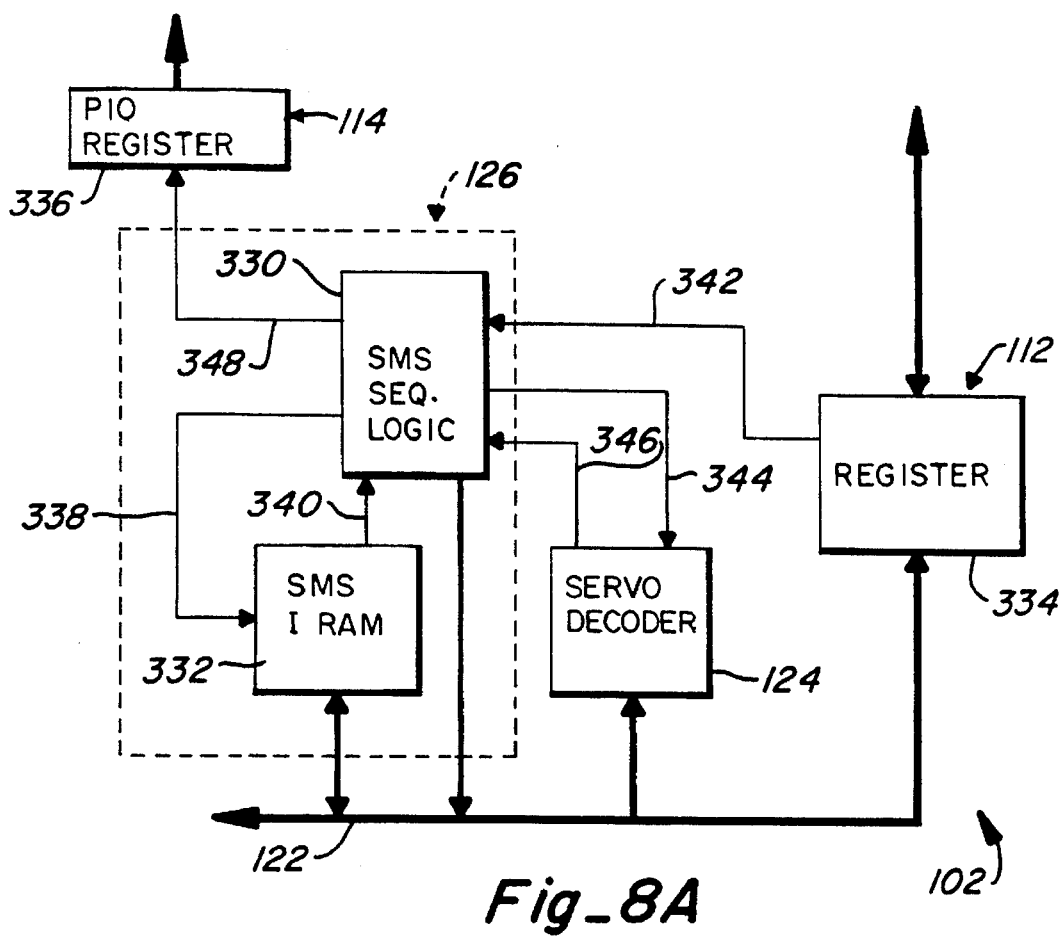
Fig_8A
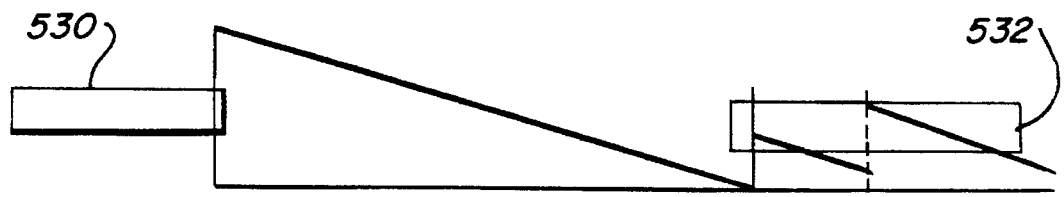
Fig_8B
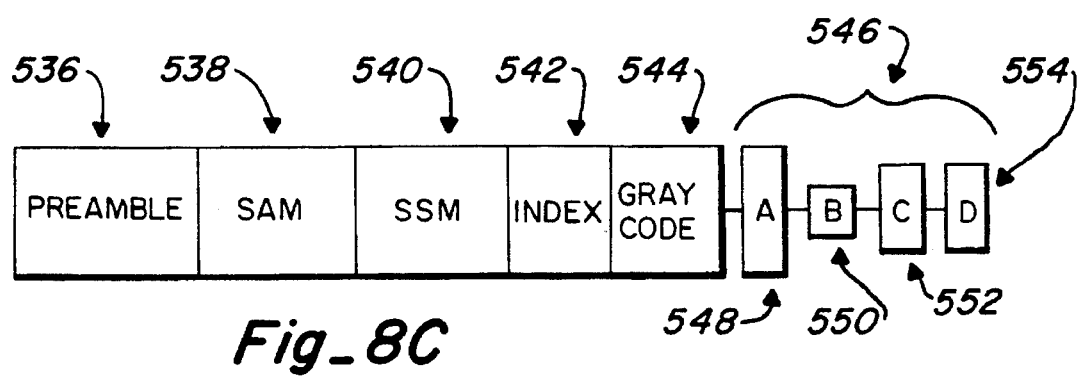
Fig_8C

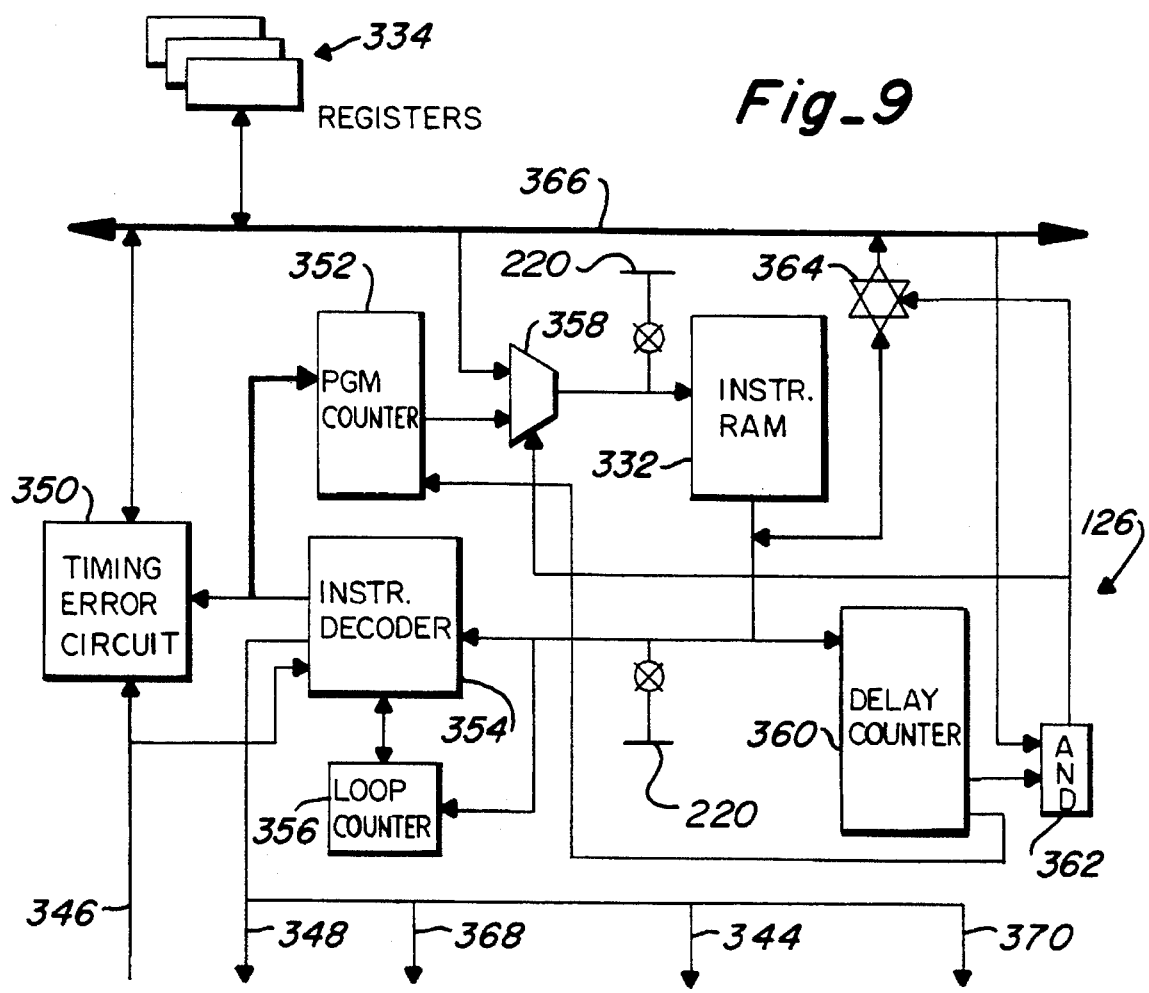
Fig_9
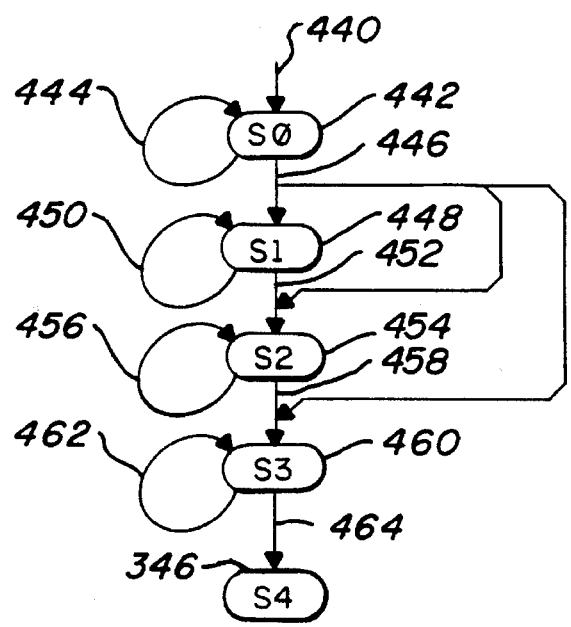
Fig_11

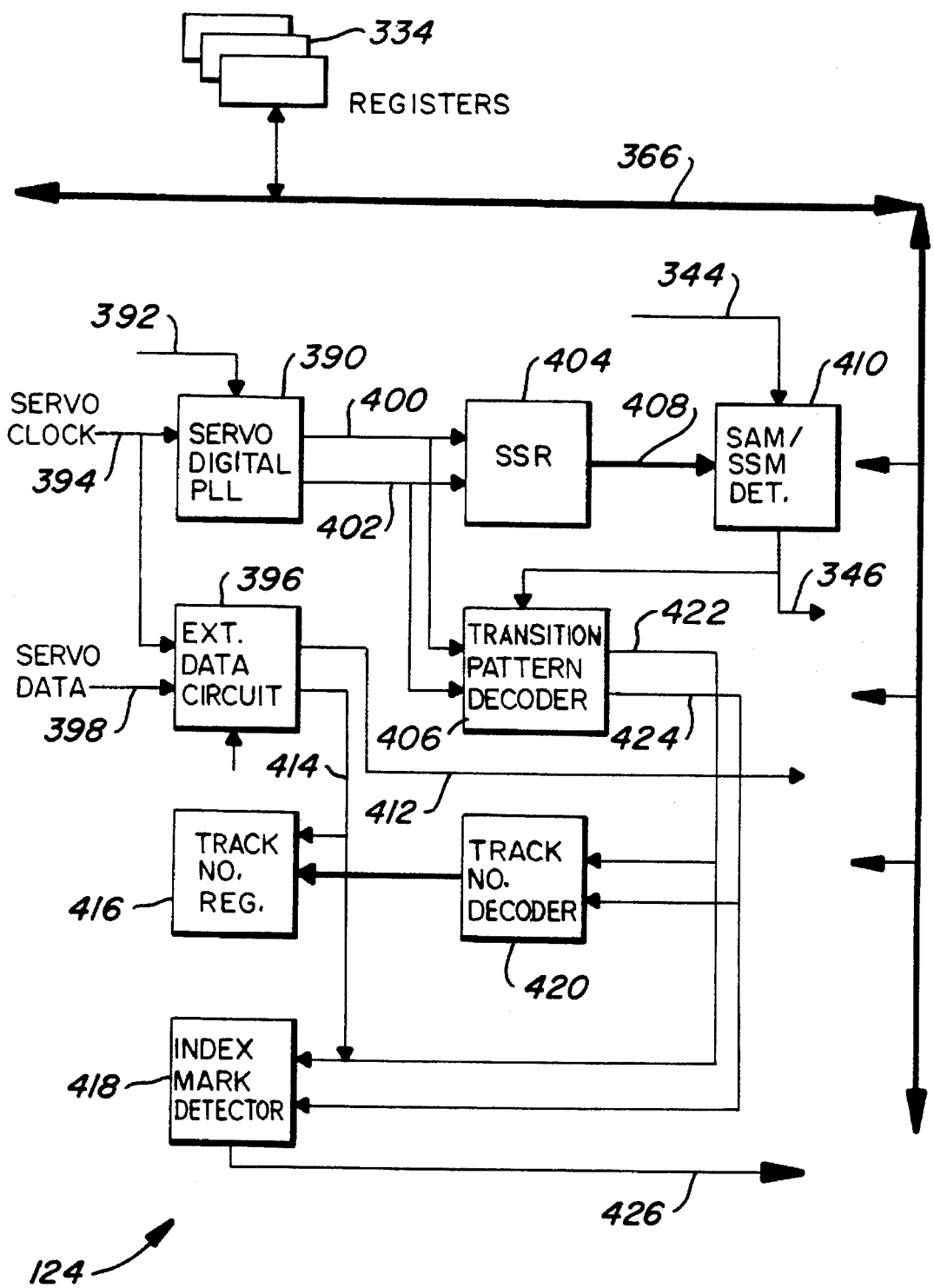
Fig_10

INTEGRATED CIRCUIT SERVO SYSTEM CONTROL FOR COMPUTER MASS STORAGE DEVICE WITH DISTRIBUTED CONTROL FUNCTIONALITY TO REDUCE TRANSPORT DELAY

This is a continuation of a U.S. patent application for "Integrated Circuit Technique For Servo System Control In A Computer Mass Storage Device," Ser. No. 08/071,773, filed Jun. 4, 1993, now abandoned.

CROSS-REFERENCE TO RELATED APPLICATIONS

The present invention is related to those described in U.S. patent applications Ser. No. 08/072,135 for SEQUENCE, TIMING AND SYNCHRONIZATION TECHNIQUE FOR SERVO SYSTEM CONTROLLER OF A COMPUTER DISK MASS STORAGE DEVICE, DEVICE, filed concurrently herewith; and Ser. No. 08/071,472, for BURST COMPARISON AND SEQUENTIAL TECHNIQUE FOR DETERMINING SERVO CONTROL IN A MASS STORAGE DISK DRIVE DEVICE, filed concurrently herewith. These related applications are assigned to the assignee hereof. These related applications are incorporated herein by this reference.

The present application also incorporates by reference herein U.S. patent application Ser. No. 07/904,804 filed Jun. 25, 1992, for DYNAMIC CONTROL OF DISK SECTORS, which is also assigned to the assignee of the present invention.

BACKGROUND OF THE INVENTION

The present invention relates, in general, to an integrated circuit and method for servo system control in a computer mass storage device. More particularly, the present invention relates to a highly integrated, monolithic servo system controller chip of particular utility in the design and implementation of actuator and spindle control of "hard", "fixed" or "rigid" Winchester disk drives.

Disk drives are computer mass storage devices from which data may be read and/or to which such data may be written. In general, they comprise a randomly accessible rotating storage medium, or disk, on which data is encoded by various means. In magnetic disk drives, data is encoded as bits of information comprising magnetic field reversals contained on the magnetically-hard surface of the rotating disk. The bits of information are arranged serially in concentric rings called tracks, which are the curvilinear arcs described on the media surface passing by a transducer or read/write "head" whose position remains fixed for an entire revolution of the disk. Typically, disk drives will comprise multiple disks, spanned by multiple read/write heads ganged to move in unison. The collection of data tracks of all such disks corresponding to any given fixed head position is defined as a "volume".

The read/write head is mounted on an actuator arm which is attached to a voice coil motor capable of moving the head/arm assembly across the disk surface at very high speeds to perform seek operations. Within each track, data is usually organized into sectors of fixed length. A sector of information data may be preceded by a header and generally followed by an error correction code ("ECC"). Typically, disk controllers use the header to verify sector position before a data transfer and the ECC aids in correcting errors that may occur when data is read.

Servo control information must be available to accurately position the disk drive head over the appropriate data track. To this end, some disk drives incorporate a dedicated servo control system in which one disk, or media, surface is permanently recorded at the time of manufacture by a high precision servo writer or similar means to create a complete set of servo tracks each with a consistent pattern characteristic of a track on which it is written. The head that spans this track is then, a dedicated servo head and provides information to the position and velocity control feedback loops of the disk drive.

An alternative technique utilizes what is known as embedded servo technology which comprises embedding servo control information in the intersector gaps on the tracks of each disk surface between blocks of information data. An embedded servo system performs fine positioning of the head with respect to the track center line and continuous on track centering by reading and responding to the digital and analog information contained within the servo control sectors.

With the decreasing size or "form factor" of computer mass storage devices, particularly disk drives, there is a concomitant need to downsize the number and physical size of the associated components as well. With this trend toward ever smaller packaging, spindle motors, voice coil motor ("VCM") actuators and the like, there is an increased emphasis on reducing the power supply requirements and chip count for the associated electronics as well. At the same time, with the reduction in size of the spindle motors and actuators, ever more sophisticated control requirements are placed on the disk drive servo electronics.

Current disk drive electronic assemblies include a number of integrated circuit modules. A read/write channel and associated analog circuitry function primarily to facilitate the reading of data from and writing of data to the information data sectors of the disk. Other components provide the requisite functionality to interface the read/write channel and low level electromechanical functionality of the spindle and the actuator to a controller module. The controller module provides an interface to a host computer bus, among other things. The "low level" electromechanical functionality of the disk drive spindle motor and voice coil motor actuator for positioning the read/write heads with respect to the rotating storage media is accomplished by means of another module or subsystem which typically includes a digital signal processor ("DSP") and associated microprocessor with related circuitry in the form of an application specific integrated circuit ("ASIC") and power drivers. An electronically programmable read only memory ("EPROM") containing micro instructions is typically associated with the DSP and microprocessor for use in controlling their functionality. The functionality of the read/write channel and the DSP/microprocessor module is controlled by the controller module and an associated random access memory ("RAM") which provides the host interface, buffer management, disk formatting and ECC functionality.

Current trends in the application and use of disk drives have also made it necessary to enhance the functionality of the modules and components which control smaller spindle motors and VCM actuators. The increased performance of computers with which the disk drives are used have placed greater demands on the disk drive to perform I/O operations more quickly and more reliably. It is also becoming increasingly desirable to provide more standardized, yet application-programmable functionality in disk drives, particularly with respect to those related to the motion control aspects of the spindle motor and VCM.

SUMMARY OF THE INVENTION

One aspect of the present invention relates to a single, monolithic integrated circuit ("IC") embodying all or substantially all of the motion control and processing functionality of a disk drive. This single IC approach to controlling a disk drive reduces the number of separate ICs, modules and components to the point where only an associated read/write channel IC and a data processor for interfacing to the local host computer bus could be required. Another aspect of the present invention is to make such a motion control and processing IC essentially application-independent and to make it meet substantially all of the major application specific needs of a large class of typical users, such as offering the capability to interface with various discrete driving and control devices which might be used for ultimately controlling the spindle motor or VCM actuator. Additionally, another aspect of the present invention is to incorporate a significant portion of the necessary analog circuitry and functionality within a single motion control and processing IC to avoid the use of the typical additional analog "glue" circuits which are also typically required for use with disk drive controllers. A further aspect of the present invention is to provide an IC approach to controlling a disk drive which allows performance enhancements even when the host computer with which the disk drive is used does not necessarily require the enhancements available from the present invention.

In accordance with these and other aspects, the present invention pertains to controlling a computer mass storage device. The storage device includes a spindle motor for rotating and controlling a storage media or disk, and an actuator for positioning at least one data transducer or head with respect to the storage media to sense encoded data thereon. The encoded data is configured in information data sectors arranged along a plurality of generally concentric data tracks. Servo data sectors are preferably positioned between the information data sectors. The present invention is preferably implemented as a single IC. The IC includes a servo subsystem portion coupled to the data transducer for detecting the encoded data of the servo data sectors and the IC providing control signals in response to the detected encoded data. An analog-to-digital subsystem of the IC is also coupled to the data transducer and is operative in response to the servo subsystem control signals for converting selected portions of the encoded data of the servo data sectors to digital transducer position information representative of a position of the data transducer with respect to the data tracks. A data processing subsystem is coupled to the analog-to-digital subsystem for processing the digital transducer position information and providing digital motion control signals in response thereto. A digital-to-analog subsystem is coupled to the data processing subsystem for providing analog control signals to the actuator in response to the digital motion control signals.

In accordance with other aspects, the present invention involves a system for controlling a computer mass storage disk drive which includes a spindle motor for rotatably controlling a magnetic disk and an actuator for positioning at least one read/write head with respect to the magnetic disk to sense encoded data thereon. The encoded data is configured in information data sectors arranged along a plurality of generally concentric data tracks having servo data sectors therebetween. Means are coupled to the read/write head for detecting the encoded data of the servo data sectors and for providing a control signal in response thereto. Means are further coupled to the read/write head and operative in response to the control signal of the detecting means for converting selected portions of the encoded data of the servo data sectors to digital transducer position information representative of a position of the read/write head with respect to the data tracks. Means are also coupled to the converting means for processing the digital transducer position information and providing motion control signals in response thereto. Means are also coupled to the processing means for providing control signals to the actuator in response to the motion control signals.

Another aspect of the present invention involves controlling a computer mass storage device which includes a spindle motor for rotatably controlling a storage media and an actuator for positioning at least one data transducer with respect to the storage media to sense encoded data thereon. The encoded data is configured in information data sectors arranged along a plurality of data tracks having servo data sectors therebetween. The system includes a first integrated circuit coupled to the data transducer for decoding the encoded data and producing an information data signal in response to the information data sectors and a second integrated circuit is coupled to the first integrated circuit for controllably interfacing the system to an external host processor and for transferring the information data signal thereto. A third integrated circuit is responsive to the first and second integrated circuits for controlling the spindle motor and the actuator to selectably cause the data transducer to be positioned with respect to the storage media to read the encoded data of a preselected one of the information data sectors of a given data track in response to the external host processor.

The third integrated circuit includes a servo subsystem coupled to servo system output signals from the first integrated circuit for detecting the encoded data of the servo data sectors and providing a control signal in response thereto. An analog-to-digital subsystem of the third integrated circuit is operative in response to the servo subsystem control signal for converting selected portions of the encoded data of the servo data sectors to digital transducer position information representative of a position of the data transducer with respect to the data tracks. A data processing subsystem of the third integrated circuit is coupled to the analog-to-digital subsystem for processing the transducer position information and providing motion control signals in response thereto. A digital-to-analog subsystem of the third integrated circuit is also coupled to the data processing subsystem for providing analog control signals to the actuator in response to the digital motion control signals.

BRIEF DESCRIPTION OF THE DRAWINGS

The above mentioned and other aspects and objects of the present invention and the manner of attaining them will become more apparent, and the invention itself will be best understood, by reference to the following detailed description of an embodiment of the invention taken in conjunction with the accompanying drawings, wherein:

FIG. 6 is a functional, logic block diagram of the analog-to-digital ("A/D") subsystem of the integrated circuit shown in FIG. 2;

FIG. 7 is a functional, logic block diagram of a general purpose timer of the integrated circuit shown in FIG. 2;

FIG. 8A is a functional, logic block diagram of the servo control subsystem of the integrated circuit shown in FIG. 2;

FIG. 8B is a simplified, schematic illustration of timing error detection functionality of the servo control subsystem shown in FIG. 2, operative from portions of the servo data information encoded within the servo data fields of a disk drive;

FIG. 8C is a simplified, schematic illustration of servo data fields of the servo data information which is detected and decoded by the servo control subsystem of the integrated circuit shown in FIG. 2;

FIG. 9 is a functional, logic block diagram of a servo microsequencer ("SMS") forming a portion of the servo control subsystem of the integrated circuit shown in FIGS. 2 and 8A;

FIG. 10 is a functional, logic block diagram of a servo decoder forming a portion of the servo control subsystem of the integrated circuit shown in FIGS. 2 and 8A; and FIG. 11 is a simplified, state diagram of operations of the servo decoder shown in FIG. 10.

DETAILED DESCRIPTION OF PREFERRED EMBODIMENTS

Figure 1:
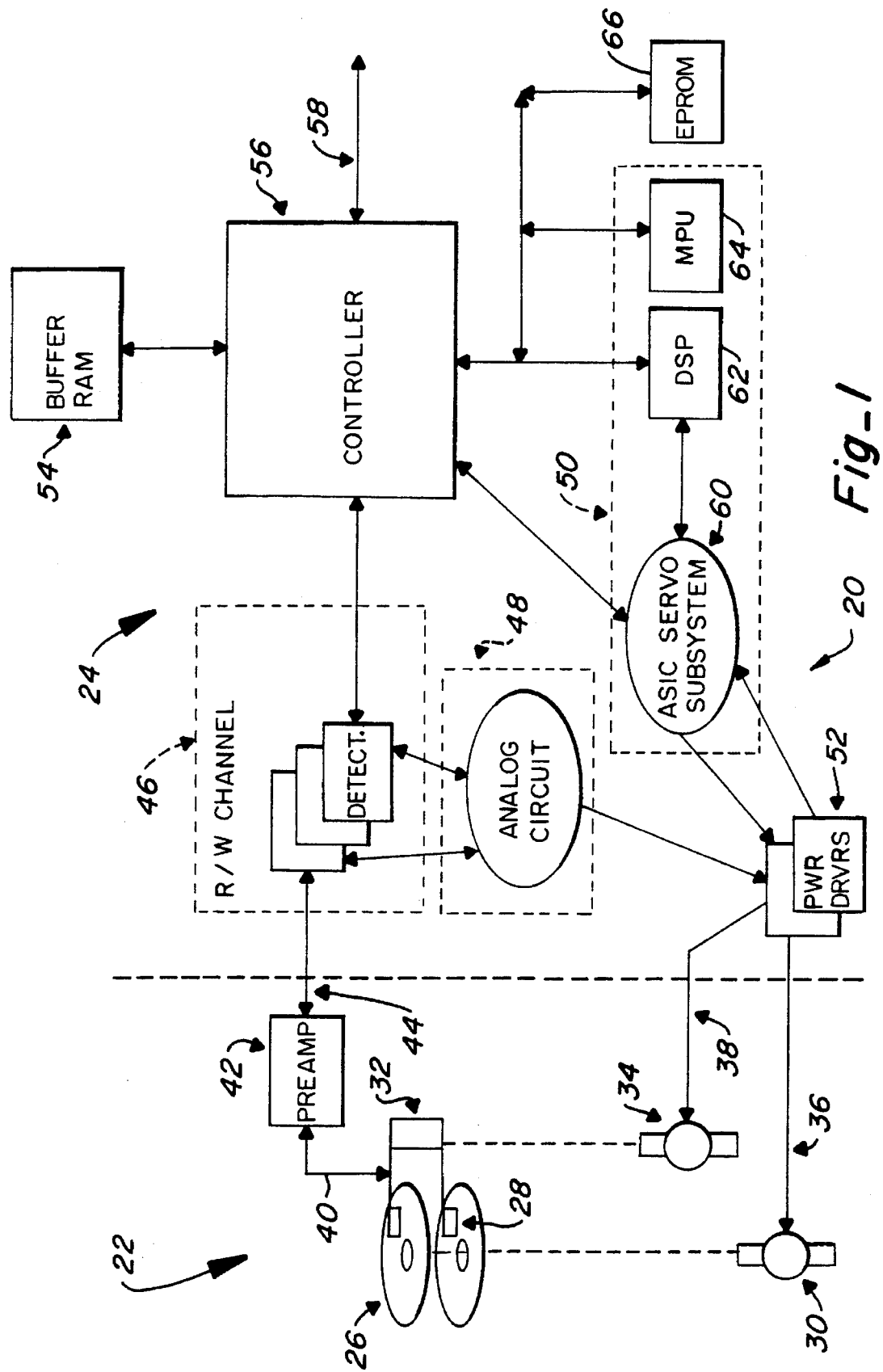
FIG. 1 is a functional, logic block diagram of a magnetic disk drive which comprises a number of integrated circuits requiring separate analog circuitry to provide effective operational control thereto, over which the present invention obtains significant improvements.

With reference to FIG. 1, a disk drive system 20 is shown. The disk drive system 20 comprises a number of integrated circuits forming a portion 24 of a magnetic disk drive in conjunction with a head disk assembly ("HDA") 22. The HDA 22 comprises one or more disks 26 upon which data may be written to, or read from, by means of a series of magnetic transitions formed on the hard magnetic surface thereof by means of heads 28. Servo information is generally placed on the disk surfaces at the time of the HDA 22 manufacture by means of a high precision servo writer or other suitable means. A spindle motor 30 causes the disks 26 to rotate with respect to the heads 28 while a voice coil motor ("VCM") 34 causes an actuator 32 to position the heads 28 with respect to the rotating surfaces of the disks 26. In this manner, the heads 28 may read or write data from the disks 26 from the number of generally concentric tracks radially extending from the inner diameter ("ID") to the outer diameter ("OD") of the disks 26.

The spindle motor 30 is operatively controlled by means of a number of spindle control signal lines 36 from portion 24 of the disk drive system 20. In like manner, the voice coil motor 34 is operatively controlled by a number of VCM control signal lines 38 from the portion 24 of the disk drive system 20.

Information data which may be written to or read from the surfaces of the disks 26 by the heads 28 (in addition to the reading of previously written servo data) is coupled to the system portion 24 by means of a number of read/write signal lines 40. Signals in the lines 40 are amplified through a preamplifier 42 for application to data channel lines 44. The data channel lines 44 provide an input to a read/write channel integrated circuit 46. In general, the read/write channel integrated circuit 46 provides an interface to a disk controller IC 56 for information written to, or read from the information data sectors of the disks 26 of the HDA 22. The read/write channel integrated circuit 46 is also coupled by means of analog circuit IC 48 to appropriate power drivers 52 for operatively controlling certain functionality of the spindle motor 30 through spindle control signal lines 36 and of the voice coil motor 34 by means of VCM control signal lines 38.

The disk drive system 20 further includes a motion control IC 50. The motion control IC 50 incorporates a digital signal processor ("DSP") 62, a microprocessor ("MPU") 64 and an application specific integrated circuit ("ASIC") servo subsystem 60 as shown. The microprocessor 64 may also be considered a microcontroller ("MCU"). The ASIC servo subsystem 60 provides an interface to the power drivers 52 for operatively controlling the spindle motor 30 and voice coil motor 34. An electrically programmable read only memory ("EPROM") 66 is operatively associated with the digital signal processor 62 and the microprocessor 64 of the motion control IC 50 to provide micro instructions for use by the components 62 and 64.

The motion control IC 50 and the read/write channel IC 46 are functionally controlled by disk controller IC 56. The disk controller IC 56 provides host interface, buffer management, disk format and error correction code ("ECC") functionality for the disk drive system 20. A buffer random access memory ("RAM") is coupled to the disk controller IC 56 as shown. The disk controller IC 56 also provides an interface to a host computer (not shown) through a host interface bus 58 such that information can be written to, or read from, the disks 26 of the head disk assembly 22 as required.

The disk drive system 20 uses a number of components, in the form of distinct integrated circuits, as shown, which must be accommodated in regard to their power consumption, consumption of space, and relatively long signal paths. Moreover, the analog-to-digital functionality of the motion control aspects must be provided in the form of the separate analog integrated circuit 48 for operatively controlling the spindle motor 30 and voice coil motor 34 of the head disk assembly 22.

Figure 2:
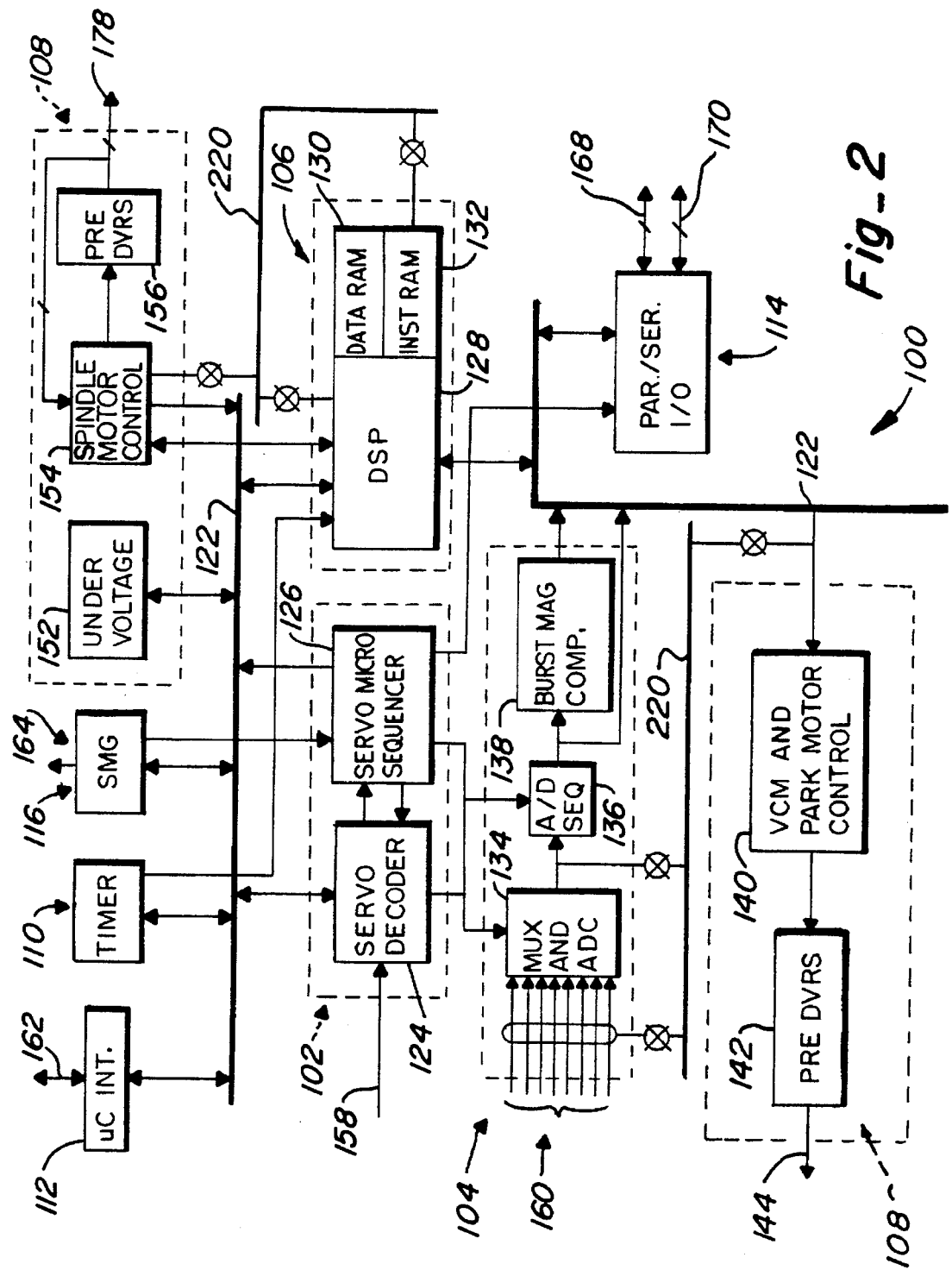
FIG. 2 is a functional, logic block diagram of an integrated circuit in accordance with the present invention in which the requisite analog circuitry for the motion control functionality of a disk drive is integrated with a digital signal processor and servo subsystem to provide low level electromechanical control functionality for the disk drive, including control of the VCM actuator, spindle motor and head parking upon detection of an undervoltage condition.

With reference now to FIG. 2, a servo system controller IC 100 in accordance with the present invention is shown which overcomes the disadvantages inherent in the previously described disk drive system 20 illustrated in FIG. 1. The servo system controller IC 100 is preferably furnished as a single integrated circuit. The servo system controller IC 100 comprises, in pertinent part, a servo timing and control subsystem 102, an analog-to-digital ("A/D") subsystem 104, a DSP subsystem 106 and a motor control subsystem 108 which are all operatively connected to an internal data and instruction bus 122 within servo system controller IC 100 as shown.

The servo timing and control subsystem 102 further comprises, in pertinent part, a servo decoder 124 and a servo microsequencer ("SMS") 126, which are coupled together. Both the servo decoder 124 and the servo microsequencer 126 are coupled to the internal data bus 122. The servo decoder 124 receives as input, an output of the servo microsequencer 126 as well as a pulse detect signal from a disk drive read/write channel (not shown) on pulse detect input line 158. More details concerning the servo control subsystem 102 are found in the concurrently filed application Ser. No. 08/072,135.

In general, the servo control subsystem 102 is responsible for servo timing control and decoding of servo data information in a computer mass storage device such as a magnetic disk drive. The server decoder 124 is a programmable logic circuit that detects a servo address mark ("SAM", 538 FIG. 8C), a servo synch mark ("SSM", 540 FIG. 8C) and a number of different patterns of Gray coded data (in the form of user defined dibits or pulse position bits) to determine (a) track number, (b) index mark (if present) and (c) off-track burst information. The detection circuitry of the servo decoder 124 for the SAM and SSM comprises, among other things, user programmable majority vote detectors which provide a level of functionally error tolerance. The detection circuitry within the servo decoder 124 is shared thereby eliminating the need for unnecessary replication of circuit hardware.

The servo microsequencer 126 is also a programmable logic circuit that controls the A/D subsystem 104 and certain portions of the parallel/serial input/output ("I/O") port 114 for external event control. The servo microsequencer 126 may be used to interrupt a digital signal processor 128 of the DSP subsystem 106 on the occurrence of certain timing events. The servo microsequencer also controls a sector mark generator ("SMG") 116. The servo microsequencer 126 also controls the servo decoder 124 to start searching for the servo data information. The servo microsequencer 126 further incorporates a timing error circuit, more fully described hereinafter, that may be used to evaluate conditions regarding unacceptable rotary speed deviations and perturbations in the magnetic disk, while the spindle control loop pulls into resynchronization.

The A/D subsystem 104 comprises, in pertinent part, a multiplexer ("MUX") and A/D converter ("ADC") 134, an A/D sequencer ("A/D SEQ") 136 and a burst magnitude comparator 138 as shown. The multiplexer and A/D converter 134 and the A/D sequencer 136 are operatively controlled by the servo microsequencer 126 of the servo control subsystem 102. A number of read channel input lines 160 from the read/write channel circuitry (not shown) of a disk drive are applied to the multiplexer and A/D converter 134 of A/D subsystem 104. A control output signal of multiplexer and A/D converter 134 is supplied to the A/D sequencer 136. A digital signal output from the A/D sequencer 136 is coupled to an input of the burst magnitude comparator 138 as well as the internal data bus 122.

The A/D converter portion of the multiplexer and A/D converter 134 achieves very fast conversions. The A/D sequencer 136 is a logic circuit that accepts inputs from either the DSP subsystem 106 or the servo microsequencer 126 of the servo control subsystem 102 to control the conversion rate of off-track servo burst information and the sequence of the burst conversions. The servo microsequencer 126 has priority over the DSP subsystem 106 in the control of the A/D sequencer 136 and may be used to queue conversions to the A/D subsystem 104. Once the queuing has finished, control of the A/D sequencer 136 is again turned over to the DSP subsystem 106. The queuing of off-track burst conversions through the servo microsequencer 126 to the A/D sequencer 136 saves code space in the DSP subsystem 106 and ensures rapid conversions since the hardware of the A/D sequencer 136 automatically accepts queued data and sequences to the next channel without DSP subsystem 106 intervention. In this manner, delay in the conversion of the off-track bursts and therefore, transport delay, is minimized.

The burst magnitude comparator 138 of A/D subsystem 104 is a circuit that continuously processes the first four channels of quadrature data corresponding to the off-track bursts from the A/D sequencer 136. As many disk drive systems employ two pairs of off-track signals, the burst magnitude comparator 138 monitors the largest signal of one pair of off-track signals and then chooses the opposite pair of the off-track bursts, which are ordered into appropriate registers in the DSP subsystem 106 register space. Use of the burst magnitude comparator 138 as a portion of the A/D subsystem 104 eliminates a number of instructions in DSP subsystem 106 firmware code and provides enhanced system performance by eliminating many microseconds of transport delay. The burst magnitude comparator 138 is bypassable, allowing the signals from the A/D sequencer 136 to be applied directly to the registers in the D/A subsystem 104.

The DSP subsystem 106 comprises a DSP 128 and an associated data RAM 130 and an instruction RAM ("INST RAM") 132. The DSP 128 is a data processor capable of performing all of the processing and control functions associated with disk drive as described herein. The DSP 128 may be, for example, a RISC processor, a CISC processor, a state matrix filter, or any other type of data processor capable of achieving the functionality described herein and-required for disk drive functionality.

The DSP 128 is coupled to the internal data bus 122 and receives a timing signal input from the general purpose timer 110. The DSP 128 is also coupled to a spindle motor control circuit 154 of the spindle control subsystem 118 as will be more fully described hereinafter.

The DSP 128 should be capable of doing relatively lengthy multiply operations very quickly. The DSP 128 preferably includes separate data and program paths for doing arithmetic with Boolean control functions. The data RAM 130 may comprise 512 words of data memory organized as two banks of 256×16. The instruction RAM 132 may typically contain 2K words of program memory.

The motor control subsystem 108 includes a VCM and park motor control circuit 140 which is coupled to the internal data bus 122. A VCM and park motor control circuit 140 receives signals from the bus supplied by the DSP subsystem 106 which are used by the circuit 140 to derive analog control signals that are applied to a VCM motor pre-driver circuit 142. The pre-driver circuit 142 applies output signals 144 to the VCM 34 to position the heads 28 at desired locations to accomplish read and write operations. In addition, the pre-driver circuit 140 responds to signals applied over the bus which cause the pre-driver circuit 140 to park the heads 28 on the media in a location where data is not located, such as the disk ID. This parking capability is used to avoid data loss in the event of an undervoltage condition to the disk drive such as a complete power loss. An undervoltage detection circuit 152 of the motor control subsystem 108 recognizes the onset of an undervoltage condition and supplies signals in response to the detected undervoltage condition on the bus 122. The signals indicative of an undervoltage condition are recognized by the DSP subsystem 106, and the control signals required to activate the park functionality of the VCM and park motor control circuit 140 are delivered by the DSP subsystem 106 over the bus 122 to the circuit 140.

A spindle motor control circuit 154 of the motor control subsystem 108 is also coupled to the internal data bus 122 and is controlled by DSP subsystem 106. The spindle motor control circuit 154 provides an output to a pre-driver circuit 156 which supplies spindle control signals on spindle motor drive lines 178. Back electromotive force ("EMF") is sensed at the spindle motor drive lines 178 and is provided as a feedback input to the spindle motor control circuit 154. The motor control subsystem 108 includes analog-to-digital converters and digital-to-analog converters to make the necessary conversions between the digital signals associated with the DSP subsystem 106 and carried over the bus 122 and those analog signals 144 and 178 which are applied to the VCM 34 and the spindle motor 30, respectively.

The general purpose timer 110 is coupled to the internal data bus 122 and comprises a multibit timer for spindle control and/or other timing control functions of servo system controller IC 100. The general purpose timer 110 further comprises a timing value prescaler as will be more fully described hereinafter.

A microcontroller interface circuit 112 is coupled to internal data bus 122. It is through the interface circuit that the servo system controller IC 100 is coupled to an external microcontroller by means of microcontroller interface bus 162. The microcontroller interface bus 162 provides an I/O mapped interface to the random access memories of the servo system controller IC 100. By means of the microcontroller interface bus 162, such RAM's may be directly written by the external microcontroller. The microcontroller interface circuit 112 is capable of supporting standard I/O timing devices and may be programmed to transfer data between the DSP 128 and the external microcontroller. In alternative embodiments of the servo system controller IC 100 wherein DSP subsystem 106 subsumes the functionality of an external microcontroller, the microcontroller interface circuit 112 may be, therefore, eliminated.

A parallel/serial I/O port 114 is controlled by the servo microsequencer 126 and is coupled to internal data bus 122. Serial I/O to and from the parallel/serial I/O port 114 is effectuated by means of serial I/O lines 168. Serial I/O lines 168 are used for general communications and may comprise three lines wherein one line is dedicated for frame information, another line is dedicated for data transfer and a third line is dedicated for clock signals. The serial portion of parallel/serial I/O port 114 is automatically configured for reception of data except when a transmission occurs.

A parallel I/O bus 170 is preferably a bit port controlled by the servo microsequencer 126 and the DSP 128, each device controlling 8 bits directly. Of the 16 lines comprising the parallel I/O bus 170, four lines overlap with either the servo microsequencer 126 or the DSP 128 controlling them. The parallel portions of parallel/serial I/O port 114 are capable of controlling all conventional read/write channels and integrated power devices.

The sector mark generator 116 is controlled by the servo microsequencer 126 of the servo control system 102 and is also coupled to the internal data bus 122. The sector mark generator 116 provides a sector pulse signal on sector pulse signal line 164 as a control signal to a data path controller to indicate when a data field is present. The sector mark generator 116 is necessary for zone (or "band") recorded disk drives since a servo field may bisect a data field in an asymmetric fashion when using embedded servo fields. The subject matter of the sector mark generator 116 is more fully described in the above referenced U.S. patent application Ser. No. 07/904,804 filed Jun. 25, 1992.

In addition to the internal bus 122, over which the normal I/O, interoperability and functionality of the elements of the servo system controller 100 is achieved, an additional monitor bus ("M bus") 220 is provided. The M bus 220 is connected by controllable switches to the DSP 128, the instruction RAM 132, the input and the output of the ADC of the element 134 of the A/D subsystem 104 and certain DAC's associated with the VCM and park motor control 140 and the spindle motor control 154 of the motor control subsystem 108. Because of the high level of integration of these elements into the single monolithic IC, they are not provided with dedicated I/O capabilities. Instead, the normal functionality of these elements is achieved by signals applied and directed over the internal bus 122. In the embodiment shown in FIG. 2 the connectivity of the DSP 128 and the RAM 132 is completely contained within the chip. The DSP 128 does not have a dedicated I/O resource, and as a consequence it becomes extremely difficult or impossible to debug programs contained in the instruction RAM 132 without direct access.

In general the M bus 220 provides the access for testing the proper functionality of the internal elements of the servo controller 100 without having to interfere with or modify the normal operations of the servo controller as occur in conjunction with the operational signals communicated over the internal bus 122. A number of examples illustrate this significance. The firmware instructions contained in the instruction RAM 132 may be debugged by monitoring the conditions over the M bus 220 and the responses over the internal bus 122 and from the other elements of the servo controller 100. The M bus 220 may be used to monitor the specific input signals to and the output signals from the MUX and ADC 134 to test and evaluate its functionality, independent of any operations which might be performed on those signals by the DSP 128. Signals applied to the M bus 220 can directly drive the motor control subsystem 108. By monitoring the operation of the spindle motor 30 and the voice coil motor 34 (FIG. 1) in response to the signals applied over the M bus 220, the proper functionality of the motor control subsystem 104 can be evaluated apart from any influence of other components of the controller 100, such as the DSP 128. The logic of the DSP can also be tested by signals applied over the M bus 220.

The M bus 220 thus offers improvements is allowing the controller 100 to be tested after manufacture, and allows the user to test the firmware and the logical operation associated with the DSP 128 and the instruction RAM 132. In some cases where a particular component is defective, M bus 220 may be used to provide the necessary internal connectivity to by-pass the defective or other element.

Figure 3:
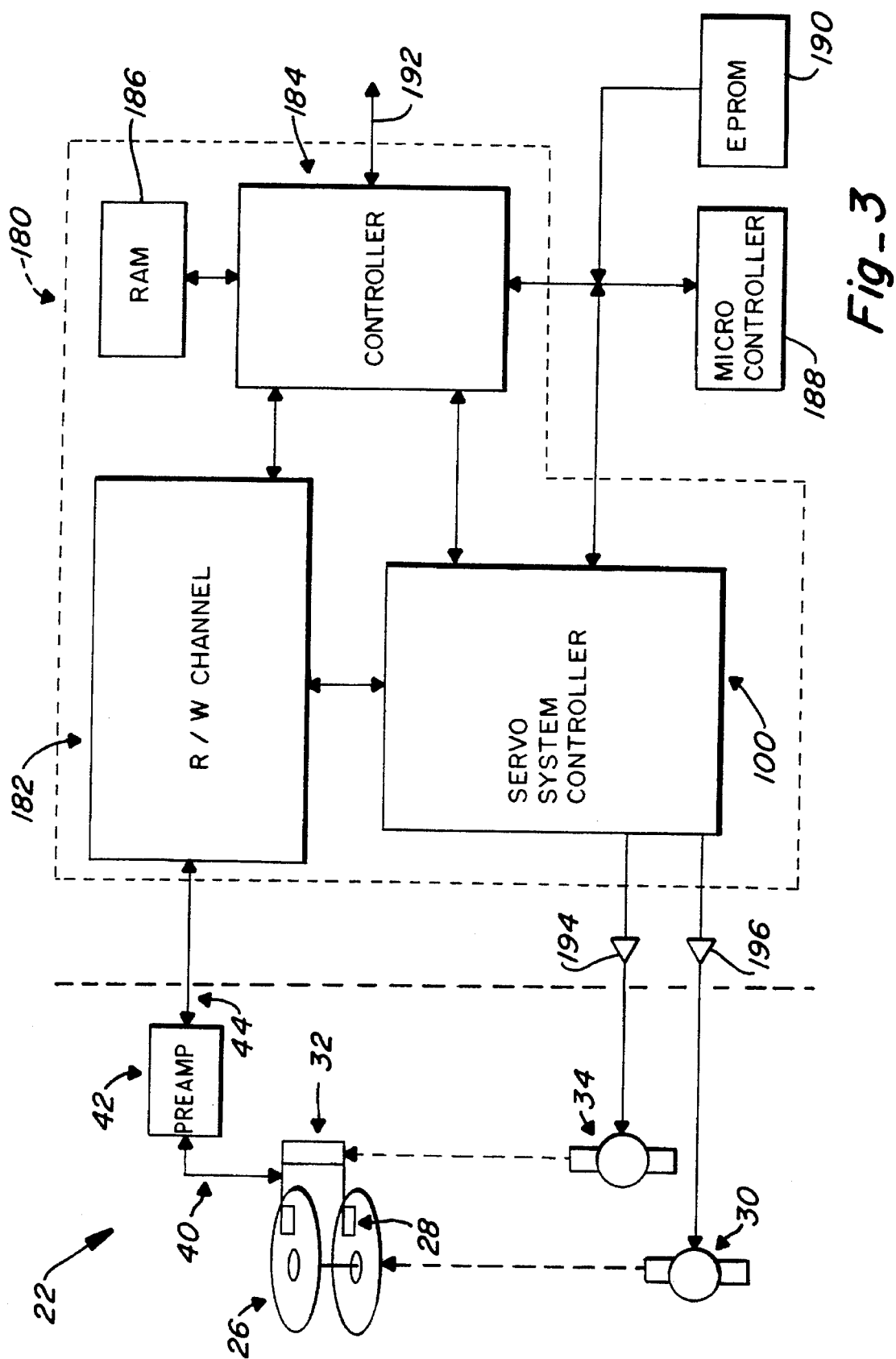
FIG. 3 is a functional, logic block diagram of a computer magnetic disk drive device, in which the integrated circuit shown in FIG. 2 is used in conjunction with read/write channel and controller integrated circuits in addition to a separate microcontroller and its associated EPROM provide enhanced low-level functional control to the disk drive spindle motor and VCM actuator.

Referring now to FIG. 3, an embodiment of a disk drive is shown. In FIG. 3, a like structure to that previously described with respect to the head disk assembly 22 shown in FIG. 1 is like numbered and the foregoing description thereof shall suffice herefor.

The circuit portion 180 shown in FIG. 3 comprises a number of integrated circuit devices for effectuating the reading and writing of data to the disks 26 as well as providing low level, motion control functionality to the spindle motor 30 and the voice coil motor 34. The disk drive 180 in accordance with the present invention comprises a read/write (R/W) channel IC 182 and a controller IC 184 with an associated RAM 186. The servo system controller IC 100, as previously described with respect to FIG. 2, is coupled to the read/write channel IC 182, the controller IC 184 and to the microcontroller 188 and its associated EPROM 190. The controller IC 184 is coupled to a host computer by means of a host interface bus 192 which may be, for example, ISA, EISA, SCSI, AT, PTCMCIA, etc. The servo system controller IC 100 provides control signals to the spindle motor 30 and the voice coil motor 34 by means of output signals applied to power stage drivers 196 and 194, in the event that such drivers 196 and 194 are not integrated within servo system controller IC 100 as previously described.

Figure 4:
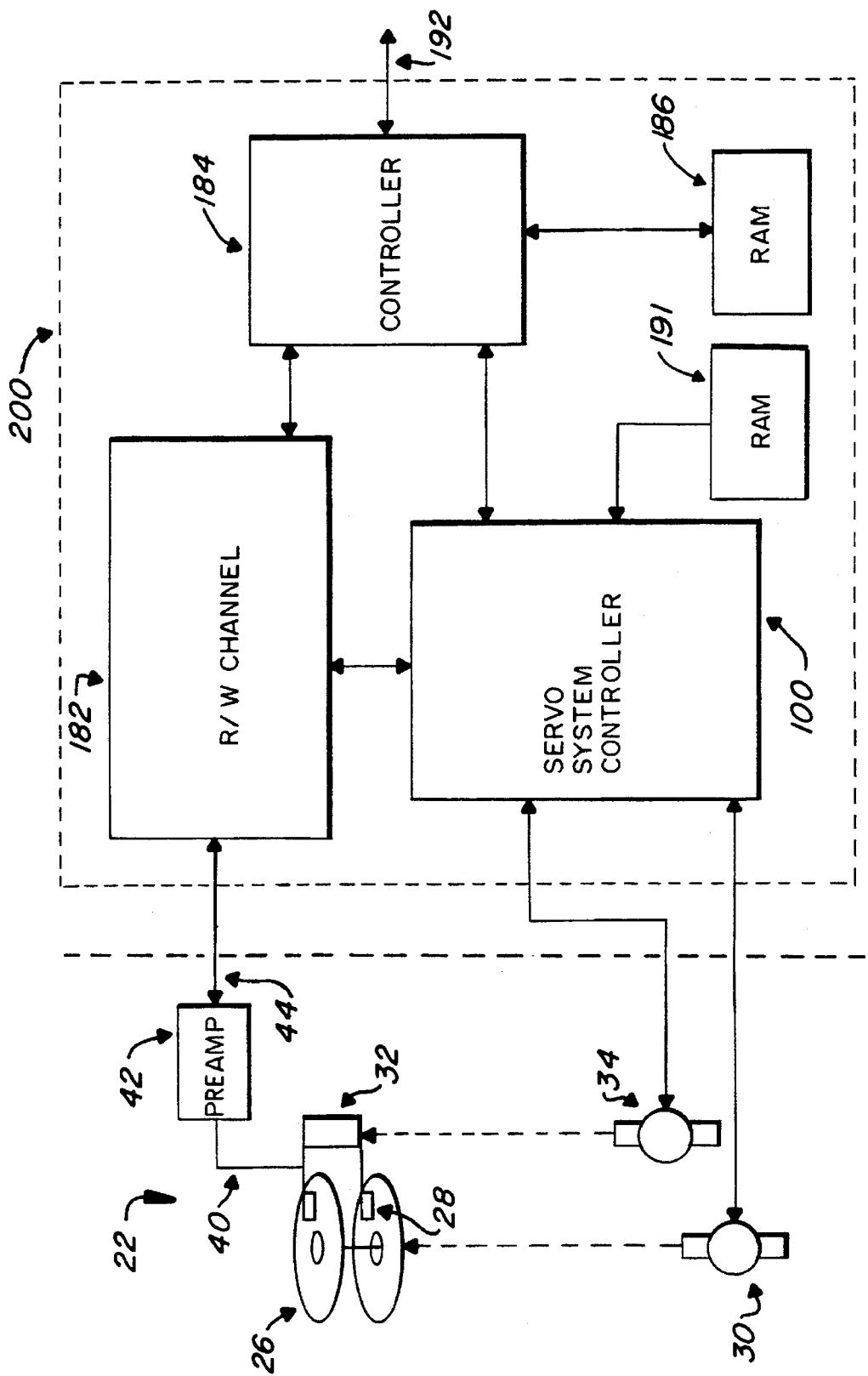
FIG. 4 is a functional, logic block diagram of a computer magnetic disk drive device, in accordance with the present invention in which the integrated circuit shown in FIG. 2 is used in conjunction with read/write channel and controller integrated circuits and in which the functionality of a microcontroller and associated EPROM is subsumed by the digital signal processor.

Referring now to FIG. 4, a reduced chip count circuit portion 200 of a disk drive is shown. With respect to FIG. 4, like structure to that aforedescribed with respect to the embodiment of FIG. 3 is like numbered and the foregoing description thereof shall suffice herefor.

The reduced chip count circuit portion 200 is made possible by an alternative embodiment of the servo system controller IC 100 which has previously been described with respect to FIG. 3. As shown in FIG. 4, the spindle motor and voice coil motor pre-driver stages are integrated in the servo system controller 100, thereby eliminating the separate power stage drivers 194 and 196 (FIG. 3). In addition, the functional capabilities of the DSP 128 (FIG. 2) within the servo system controller 100 are enhanced sufficiently to assume the functions of, and thereby allow the elimination of, the separate microcontroller 188 (FIG. 3) and the EPROM 190 (FIG. 3). A read only memory ("ROM") 191 is also available for the DSP of the controller 100, to retain certain instructions for use by the DSP.

Figure 5:
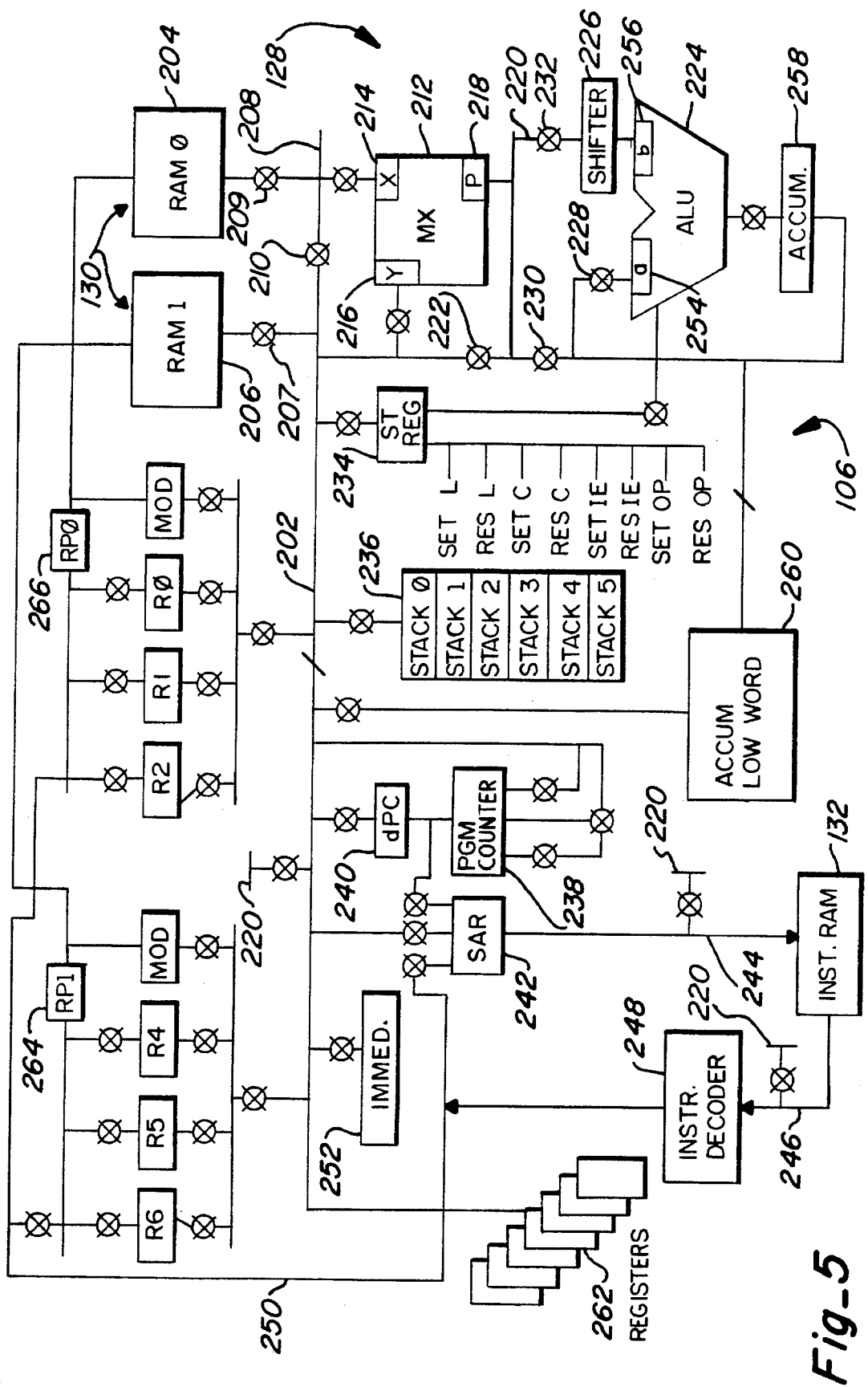
FIG. 5 is a functional, logic block diagram of the digital signal processor ("DSP") subsystem of the integrated circuit shown in FIG. 2.

Referring now to FIG. 5, the DSP subsystem 106 of the servo system controller IC 100 is shown in greater detail. The DSP subsystem 106 comprises an internal 16 bit data bus ("D Bus") 202. The internal 16 bit data bus 202, which functions as the internal data bus 122 shown in FIG. 2, directly connects to a register bank 262 for communication with the servo microsequencer 126, the A/D subsystem 104, the motor control subsystem 108 and an external microcontroller through the microcontroller interface circuit 112 as previously described with respect to FIG. 2. RAM1 206 is connected to the internal 16 bit data bus 202 by means of a switchable bus connector 207. RAM0 204 is connected to a S Bus 208 by means of another bus connector 209, and the S Bus 208 is connected to internal 16 bit data bus 202 by means of a bus connector 210. In combination, RAM0 204 and RAM1 206 comprise data RAM 130 as previously described with respect to FIG. 2.

The internal data bus 202 and the S Bus 208 are both 16 bits wide and the bus connector 210 is normally closed except when multiply instructions are executed with the option to separate the buses 202 and 208. An X input register 214 and a Y input register 216 to a multiplier ("MX") 212 are also connected respectively to the S Bus 208 and the internal data bus 202. By means of the internal data bus 202 coupled to RAM1 206 and the S Bus 208 coupled to RAM0 204, a fast multiply pipeline is set up with one of the data RAM's 130 containing coefficients and the other containing data. This type of structure can implement IIR, FIR or state variable filters with a minimum of transport delay.

The multiplier 212 preferably implements a full 16×16 multiply, to form a 31 bit product, including sign bit. This result is stored in a P register 218. The P register 218 is connected to the M Bus 220, with which all of the inputs and outputs of the arithmetic logic unit ("ALU") 224 and accumulator 258 are connected. The most significant 16 bits of the M Bus 220 are connected to the internal 16 bit data bus 202 through a switch 222.

The multiplier 212 has a detection circuit to force the P register 218 to hexadecimal value of 07FFH when a −32767×−32767 multiplication is attempted. The ALU 224 has a 32 bit width output. All operations may be done in 2's complement fixed point mode. One of the two inputs (A input 254 or B input 256) is always connected to the accumulator 258 register through bus switches which, in turn, are connected to the M Bus 220. The other input to the ALU 224 is supplied from the M Bus 220 through (+1, 0, −1, +3 bit) data shifter 226. The data shifter 226 can work only for the accumulator 258 modification instruction (+1, −1 bit) or MAC instructions (+3 bit). Overflow protection logic is implemented for ADD/SUB/ABS/NEG instructions as an option if elected by the proper bit of a status register 234 of the ALU 224. The status register 234 is a 16 bit register which reflects the status of the ALU 224 and the machine set up as connected to the internal 16 bit data bus 202. The status register 234 is cleared by a reset signal. A data shifter 226 is coupled to the M Bus 220 by means of a bus connector 232 while the A input 254 to the ALU 224 is coupled to the M Bus 220 by means of bus connectors 228 and 230.

A six level stack 236 is connected to the internal 16 bit data bus 202 to maintain the return address of subroutine calls and interrupts. Since the stack 236 is implemented as a shift register, no stack pointers exist. The overflow from the six level stack 236 is not detected in hardware. However, it can be used for temporary data storage.

A program counter 238 is coupled to the internal data bus 202 through delay buffer register dPC 240. The program counter 238, along with some interfacing buffer registers, are designed to make two cycle branch/call instructions possible. A sequence address register ("SAR") logic register 242 develops the program address ("PA") bus 244. The SAR register 242 may be set from the internal data bus 202, the program counter 238, program data ("PD") bus 246 and an interrupt vector address register. The program address bus 244 contents may be incremented and fed to the program counter 238 or directly to the internal data bus 202. The program counter 238 register can be loaded with the data from the internal data bus 202 and has a master/slave architecture to match the timing requirements of the internal data bus 202. As shown, program address bus 244 addresses the instruction RAM 132 for generating information presented on program data bus 246 for the instruction decoder 248. The instruction decoder 248 applies its output to an instruction bus 250 which is also connected to the SAR logic register 242.

Immediate data of certain instructions are sent to an immediate register 252. The data is then supplied onto the internal data bus one cycle later. The instruction register 248 is loaded at the beginning of the next to last cycle of the last instruction. An instruction decode operation therefore starts after the first cycle of the new instruction. Two RAM pointer blocks ("RP1", "RP2") 264 and 266, respectively, are connected through the buffers to the internal data bus 202. Each RAM pointer block 264 and 266 contains three 8 bit pointer registers and one implied pointer. The registers are set to any value through a buffer, and may be incremented or decremented by its associated hardware. Direct address data is loaded from the program data bus 246 so that a direct addressing mode can be used.

The multiplier 212 can multiply two 16 bit, two's complement numbers to form a 31 bit, 2's complement product in one machine cycle. When both X input register 214 and Y input register 216 of the multiplier 212 are set to a hexadecimal value of 8000H, an internal flag is set to force an additional increment in bit 16 to have a hexadecimal value of 7FFE00 as the result of the calculation. The multiplier 212 is based on a 2's complement Booth's algorithm.

The 32 bit width of the arithmetic logic unit 224 is optimized for dynamic range considerations when the desired result of a multiply-accumulate operation is 16 bits. The arithmetic logic unit 224 allows two 32 bit inputs to be loaded onto the A input 254 and B input 256 respectively. The A input 254 is always fed by the accumulator 258 register. The B input 256 is fed from the M Bus 220 through the data shifter 226. The data shifter 226 can shift the data (32 bits) by +3, +1, 0, or −1 bits in an arithmetic mode. The +3 bit (right) shift however can be assigned only when the P register 218 of multiplier 212 is the source of the data on the M Bus 220. For any right shift, the sign bit will be extended automatically. The rotate operation also utilizes this data shifter 226.

The accumulator 258 latches the output of arithmetic logic unit 224 at the first phase of the next machine cycle so that the arithmetic logic unit 224 can keep a half cycle computation time. The contents of accumulator 258 can be read onto the M Bus 220. Direct storage to memory is, however, limited to the most significant 16 bits of the accumulator 258, since the M Bus 220 is, in turn, connected to the 16 bit internal data bus 202. The lower 16 bits of the accumulator 258 may be first stored to a register and then stored to memory.

As previously described, the main bus of the servo system controller IC 100 is the 16 bit internal data bus 202 (internal data bus 122 of FIG. 2). The internal data bus 202 is directly accessible by other components in the servo system controller IC 100 through the register bank 262. The S Bus 208 is connected to RAM 0 204, the X input register 214 and the bus connector 210. The bus connector 210, in combination with the connector 222 couples the S Bus 208 to the M Bus 220 and, when the S Bus 208 and the M Bus 220 are connected, they participate in normal data transfer instructions. When the multiply instructions are executed using the X input register 214 and the Y input register 216, the bus connector 210 will be open and the S Bus 208 will be independent.

The M Bus 220 preferably has a 32 bit width and the most significant 16 bits of it are connected to the internal 16 bit data bus 202 through connector 222. The accumulator 258 and P register 218 use the M Bus 220 to pass data to the arithmetic logic unit 224. When modification and multiplication instructions for the accumulator 258 are executed, the connector 222 between the M Bus 220 and the internal data bus 202 will be open to isolate the M Bus 220.

The 16 bit program counter 238 is buffered with an additional delay buffer register dPC 240 to feed its data onto the internal data bus 202. The buffer register 240 is latched from the 16 bit internal data bus directly. Because the program counter 238 is updated at the beginning of the second half cycle, this half clock delay buffer register dPC 240 is necessary to match the internal 16 bit data bus 202 cycle.

A 16 bit SAR logic register 242 is assigned as the program address bus 244 output buffer register which is normally tied to the program counter 238 through a 16 bit incrementer (+1) from the SAR 242 to the program counter 238. Data in the program counter 238 is transferred to the SAR logic register 242 at the beginning of each cycle, and is available through the program address bus 244. The program counter 238 is loaded with the incremented data of the SAR logic register 242 at the beginning of the second half cycle. The incremented data from the SAR logic register 242 is also directly available to the 16 bit internal data bus 202. This path is used to transfer the next program counter 238 value to the six level stack 236 in certain instructions or an interrupt handling routine, or when incrementing the pointer value in a program memory reference instruction.

There are four input paths to the SAR logic register 242, the first being from the program counter 238. This path will be active in the last cycle of the instruction. Because a large percentage of the instructions are one cycle instructions, this path is normally selected. The second path is from the internal data bus 202. Program memory reference instructions use this path to output the pointer value read from the data RAM 130 (FIG. 2). The incremented value will be stored in the data RAM 130 (FIG. 2) through the incrementer. The third path is from the program data bus 246. This direct path from the program data bus is employed by the certain other instructions. The fourth and last path is from the interrupt vector address register. This path will be activated when interrupts are acknowledged to set the specific address in which the interrupt vector resides.

The six level stack 236 is a six level push-pop stack. When the data is written from the internal data bus 202, it pushes data onto the stack 236. Data previously residing at the bottom of the stack 236 is discarded. When data is read from the stack, all values are moved up one location. The bottom of the six level stack 236 is filled with a hexadecimal value of FFFF.

Referring now to FIG. 6, the A/D subsystem 104 is shown in greater detail. The A/D subsystem 104 is described in more detail in the above referenced U.S. patent application Ser. No. 08/071,472. The A/D subsystem 104 includes a A/D converter ("ADC") 280 and a multiplexer ("MUX") forming a portion of multiplexer and A/D convertor 134. The A/D subsystem 104 is controlled by the servo microsequencer 126 or by the DSP 128, or a combination of both, as shown in FIG. 2. Inputs to A/D converter 280 pass through the multiplexer 282, and these inputs include the eight read channel input lines 160.

When the servo microsequencer 126 is programmed to perform the conversions, the conversions occur sequentially from channel 0 to channel n. Channel n is indicated by MAX A/D MUX bits in an I/O control register 284. Conversion is initiated by the servo microsequencer 126. After the completion of conversion for channel n, the end of convert ("EOC") bit is set, and control of the A/D converter 280 is turned over to the DSP 128. The DSP 128 may control the conversion of any channel by writing to the MAX A/D MUX bits and then setting the A/D start bit. The DSP 128 must assure, however that the MAX A/D MUX bits in the I/O control register 284 are set to channel n before the next servo field is detected, otherwise the servo microsequencer 126 will convert only up to the last channel converted by the DSP 128.

In a typical mode of operation, the servo microsequencer 126 is programmed to convert the four off-track bursts (as will be more fully described hereinafter), and the DSP 128 controls the conversion of the other four channels. The hardware assist circuit in the A/D sequencer 136 queue the start convert pulses of the servo microsequencer 126 until the end of convert signal is received from the A/D converter 280. Upon completion of the conversion of channel x, the conversion of channel x+1 is started. This sequence repeats until the channel represented by the MAX A/D MUX bits has been converted, at which point the DSP 128 regains control of the conversion process.

Upon detection of a new servo field, the address counters in the A/D sequencer 136 logic are reset automatically, and the servo microsequencer 126 controls the conversion process again. When the last analog burst is converted, the A/D address counter contains the same value as the MAX A/D MUX bits, and control of the A/D converter 280 reverts to the DSP 128.

The servo microsequencer 126 provides a "start pulses" input to a multiplexer 286 having as its other input a "start A/D" signal from the I/O control register 284. The output of the multiplexer 286 controls the operation of A/D sequencer 136 to provide an "A/D channel" input to multiplexer ("MUX") 282 of analog multiplexer and A/D converter 134. The A/D converter 280 is coupled to A/D sequencer 136. The A/D sequencer 136 supplies an "A/D mode" input to the multiplexer 286 to control the selection of the signals applied to the multiplexer 286. The "A/D mode" signal is also applied to the I/O control register 284. A "Max A/D channel" output from I/O control register 284 is also applied to the A/D sequencer 136.

The A/D converter 280 places digital values in register bank one 288 and register bank two 290, the bank comprising channels 0 through 7. The A/D sequencer 136 also places certain values in servo status register 298.

The burst magnitude comparator 138 is a logic circuit that functions to continuously monitor the values in channels 0 through 3 of A/D converter 280 as otherwise placed in register bank one 288 and register bank two 290. It is assumed that the four quadrature off-track bursts (A-D) are placed on channels 0 through 3 respectively. As the bursts are converted, the burst magnitude comparator 138 detects the largest of the four 4 bursts and places the converted value of the opposite ordered pair into a U/V register bank 292 comprising a U register 294 and a V register 296. The values of the bursts are mapped into the U register 294 and the V register 296 as shown:

| Largest Burst | Choose Pair | U | V | Burst Select Bits |
| --- | --- | --- | --- | --- |
| A(channel 0) | C,D | C | D | 00 |
| B(channel 1) | C,D | D | C | 01 |
| C(channel 2) | A,B | B | A | 10 |
| D(channel 3) | A,B | A | B | 11 |

Operation of burst magnitude comparator 138 is automatic, however it may be bypassed by reading the raw data from the registers of register bank one 288 and register bank two 290. The burst select bits indicate which pair was mapped into the U/V registers 292 and the ordering of the selected pair. The burst select bits may be read at any time in the I/O control register 284.

With reference now to FIG. 7, the general purpose timer 110 of the servo system controller IC 100 is shown. General purpose timer 110 is coupled to an internal data bus 122 and comprises an initial timer count value register 320 and a timer control register 322. The output of the initial timer count value register 320 is applied to a timer 316 of a timer system 314 as controlled by an output "auto reload" of the timer control register 322. The timer control register 322 also provides a "start/stop" input to the timer 316. The timer control register 322 provides a "timer pre-scaler" input to timer pre-scaler 312, having as another input a signal "DSPCLK" appearing on a DSP clock signal line 310. The output of timer pre-scaler 312 is supplied to the timer system 314, and the timer count value register 318 applies a digital value to data bus 122.

The general purpose timer 110 may be used for control of the spindle motor or other precision timing events. Timer pre-scaler 312 divides down the DSPCLK signal 310 by either one, two, four or eight. The general purpose timer 110 has two modes of operation, single event and multiple event. In the single event mode, an auto reload bit of the timer control register 322 is reset, the initial timer count value register 320 is loaded and the start bit of the timer control register 322 is set. This initiates the countdown sequence. The sequence stops and a timer interrupt is generated when the count reaches zero in the timer count value register 318. The general purpose timer 110 may be stopped at any time by setting the start/stop bit of the timer control register 322.

In the multiple event mode, the auto reload bit is set, and the process proceeds as above described. When a "zero" count is reached, the timer interrupt is generated and the initial timer count value is reloaded into initial timer count value register 320 and the counting sequence continues. This process will continue until the start/stop bit is reset.

In both modes of operation, the timer count value register 318 may be read at any time over the bus 122, with the provision that the software values must be debounced.

With reference now to FIGS. 8A, 8B and 8C, the structure and operation of the servo control subsystem 102 is illustrated. The servo control subsystem is the subject of the above referenced co-pending application Ser. No. 08/072,135 "Sequence, Timing and Synchronization Technique for Servo System Controller of a Computer Disk Mass Storage Device".

As has been previously described with respect to FIG. 2, servo control subsystem 102 comprises the servo decoder 124 and the servo microsequencer 126 coupled to internal data bus 122. The servo microsequencer 126 comprises a SMS sequencing logic circuit 330 and SMS I RAM 332. The SMS I RAM 332 comprises 64 by 8 bit of random access memory.

The SMS sequencing logic 330 of the servo microsequencer 126 controls a PIO register 336 of parallel/serial I/O port 114 by means of a PIO line 348. The SMS sequencing logic circuit 330 receives a "Start SMS" signal on line 342 from microcontroller register 334 of microcontroller interface circuit 112. The SMS sequencing logic 330 provides an SMS address signal on the SMS address line 338 to the I RAM 332 and receives an SMS data signal on SMS data line 340.

The SMS sequencing logic circuit 330 enables a search for a servo synch mark of a servo data field by sending an enable servo synch mark search signal on line 344 to the servo decoder 124. When the servo decoder 124 finds the servo synch mark, it sends a return signal to the SMS sequencing logic 330 on line 346. Configuration data for the servo decoder 124 is supplied on an internal data bus 122 and a read/write command of the instruction RAM of the SMS I RAM 332 is likewise supplied by the internal data bus 122.

The servo microsequencer 126 is a programmable timing engine used for generating windows used in the detection of the servo data fields embedded between the information data fields on the tracks of the disk. Consecutive servo fields 530 and 532 are illustrated in FIG. 8B. The structure of each of the servo fields 530 and 532 is further illustrated in FIG. 8C.

Each servo field 530 and 532 comprise a preamble 536, a servo address mark ("SAM") 538, a servo synch mark ("SSM") 540, an index 542, a Gray code 544 and a collection of four off-track bursts 546 comprising A burst 548, B burst 550, C burst 552 and D burst 554.

The servo microsequencer 126 enables the servo decoder 124 to begin searching for the aforedescribed fields within the servo data field as shown in FIGS. 8B and 8C. The servo microsequencer 126 is responsible for controlling the read/write channel 182 (FIGS. 3 and 4) by means of PIO line 348 in addition to enabling the servo decoder 124. The servo microsequencer 126 may be programmed to control the read/write channel 182 automatic gain control ("AGC") and the acquisition of the off-track bursts 546. The servo microsequencer may also be programmed to control the A/D subsystem 104 (FIG. 6) in a sequential burst mode.

The servo microsequencer 126 may be used as a detector for a software phase lock loop to control and update the timing between servo fields 530 and 532. The software loop is included in the external microcontroller 188 (FIG. 3) or DSP 128 (FIG. 4) if utilized. The servo microsequencer 126 allows a significant degree of timing control over the synchronization of servo fields 530, 532 in the presence of external disturbances.

Servo decoder 124 is a state machine that is enabled by the servo microsequencer 126. The servo decoder 124 detects a valid servo synch mark ("SSM") 540 and resets the servo microsequencer 126 to location 0 of its SMS I RAM 332. The servo microsequencer 126 then loads a count that represents the elapsed time (measured in servo clocks) until the occurrence of the off-track bursts 546. The servo microsequencer 126 then controls the sample and hold ("S/H") circuits in the read/write channel IC 182 (FIG. 3) and the conversion of the off-track bursts 546 by means of A/D subsystem 104. On completion of the analog-to-digital conversion of the off-track bursts 546, a delay is initiated that will place the next window over the next servo field 532 preamble 536. At this point the servo microsequencer 126 may be programmed to control the AGC. A programmable timing analysis will indicate when the end of the SSM 540 of the current servo field 530 is expected, and the servo microsequencer 126 initiates a timing error logic circuit as will be more fully described with respect to FIG. 9. If the system is operating at nominal speed, the timing error counter will reach a count of 0 when the SSM 540 is detected.

With particular reference to FIG. 8B, upon SSM 540 detection the value in the timing error counter is automatically loaded into a timing error register and the absolute value is compared against a timing error limit value in a register. If the difference is greater than 0 and a timing error interrupt mask bit has been set, the microcontroller 188 is interrupted. In the example shown in FIG. 8B, the new SSM of the next servo field 532 is early, so the count had not reached 0 when the new SSM was detected. The value in the counter is transferred to the timing error register, compared against the timing error limit and the delay counter is reloaded to search for the off-track bursts 546.

With particular reference to FIG. 8C, and as previously described, the servo field 530 includes a preamble 536, a servo address mark ("SAM") 538 (comprising one or two servo address fields ("SAF"), a servo synch mark ("SSM") 540, index 542, Gray code 544 and off-track bursts 546 (A Burst 548, B Burst 550, C Burst 552 and D Burst 554).

The preamble 536 may be either a sequence of high frequency dibits (pairs of magnetic field reversals) or pulse position bits depending on specific application programming, that may be used for AGC acquisition. When the servo microsequencer 126 initiates the servo decoder 124 to search for a valid SSM 540, servo decoder 124 first looks for the SAM 538.

one or two contiguous SAF's may be detected as a valid SAM 538. The number of fields expected by the servo decoder 124 is programmed in a decoder configuration register. These servo address fields may be separated by a transition, or alternatively, may have no transitions delimiting the field boundaries. The length of the fields are programmed in the servo address configuration register.

The presence of a valid SAM 538 is detected with a majority voter circuit. Upon initialization, the input shift register is forced high and the SAM 538 target byte register is compared against all logical highs. The data is shifted into the input shift register and the outputs of the comparator are tallied. The result is compared against the selected programmed threshold. If the tally is equal to or exceeds the threshold, a valid servo address field is considered to have been detected. If the user programs only one servo address field per SAM 538, and a valid SAM 538 is detected, the servo decoder begins looking for the SSM 540. If the user programs two servo address fields per SAM 538, then the servo decoder searches for two contiguous servo address fields before posting a valid SAM 538.

The SSM 540 is a unique programmably defined pattern that is detected with the majority voter circuit. In a specific application, the SSM 540 target byte register is programmed with a pattern to be detected and the SSM 540 threshold. If the count is equal to or exceeds the threshold, then a valid SSM 540 detection status is posted.

The index field 542 in only one servo field contains an index mark. The index mark is represented either by a dibit (logical one), or by a pulse position bit (logical one). Conditions for a valid detection are that the index mark pattern was found and a valid confirmation pattern preceded it and the servo field count has rolled over. An interrupt to the microcontroller 188 will be generated if the proper bit of the microcontroller interrupt mask register is set.

Gray code 544 is used for track number coding schemes and multiple track Gray code numbering schemes may be supported. The code may be used in a modulo fashion by appending code sequences together. For example, if 12 bits of track number were required, 4 code sequences would be encoded on the track, yielding 32 coded cells. The modulus is set by programming the appropriate bits of the decoder configuration register. The hardware implementation assumes that the data has been encoded properly on the disk, and during decoding will automatically decode the modulus groups correctly. This is accomplished by saving the least significant bit of the decoded binary group of the previous group, and if "1" the next group is expected to be inverted This assures that there will be no more than one bit change within groups, or between groups. The types of Gray code supported are preferably a dibit, a pulse position code with a 3 cell pattern (PPC(3)), and a pulse position code with a 2 cell pattern (PPC(2)).

Any combination of off-track bursts 546 and burst intervals may be used that is compatible with the timing resolution of the counters in the servo microsequencer 126.

Referring now to FIG. 9, the servo microsequencer 126 is shown in greater detail. The servo microsequencer 126 may be used for timing control and sequencing of the analog-to-digital subsystem 104, the read/write channel IC 182 and the servo decoder 124. In addition, the servo microsequencer may be used to interrupt the DSP subsystem 106 as an auxiliary timer to the general purpose timer 110 (as shown in FIG. 2). The servo microsequencer 126 comprises a 12 bit delay counter 360, a loop counter 356, a program counter 352, an instruction decoder 354 and a timing error detection circuit 350. The SMS I RAM 332 may be written and read directly through the microcontroller registers 334 during an initial boot operation. In addition, SMS I RAM 332 may also be written and read during operation when not being accessed by the servo microsequencer 126. Contention is arbitrated by assuring that the delay counter 360 has a count of greater than 2 before access is given.

As previously described, an input SSM Fnd Signal is applied to the timing error detection 350 and the instruction decoder 354 of the servo microsequencer 126. The instruction decoder 354 provides an output on line 348, a start convert pulse output 368 to the A/D sequencer 136, an enable servo synch mark search signal 344 to the servo decoder 124, and a DSP interrupt 370.

A microcontroller register bus 366 couples the microcontroller registers 334 to the timing error detection circuit 350 and to a multiplexer 358. An additional input to the multiplexer 358 is received from the program counter 352 as controlled by the output of an AND circuit 362 which has its inputs coupled to microcontroller register bus 366 and an output of delay counter 360. The output of the AND circuit 362 is supplied to a transmission gate switch 364 which couples the microcontroller register bus 366 to the instruction RAM 332. The delay counter 360 has an additional output provided as input to program counter 352.

The timing error detection circuit 350 is controlled by a timing error limit register and the SSM Fnd 346 signal from the servo decoder 124. The timing error detection logic 350 is loaded with a predetermined count upon receiving an "enable phase error counter" signal from the instruction decoder 354. The counter counts down until SSM Fnd 346 signal stops the counter. The output of the counter is continuously compared against the value in the phase limit register. If the phase error register exceeds the value in the phase error limit register, an interrupt is generated to the microcontroller 188. This interrupt is controlled by the microcontroller interrupt enable register, one of microcontroller registers 334.

The servo microsequencer 126 may be started in several ways. In operation, the servo microsequencer 126 begins when a Strt SMS signal is asserted which occurs when the start SSM search bit of the decoder configuration register is set and the servo decoder 124 has detected a SSM 540. It is stopped when the start SSM search bit is reset. Another way to start the servo microsequencer 126 is to set the start SSM search bit and the SMS direct "on" bit in the DSP 128 configuration register.

A fast servo phase locked loop ("PLL") may be implemented with the building blocks in the servo microsequencer 126. Nominal timing control is assured by programming the servo microsequencer 126 such that the delay counter 360 reaches a count of 0 at the predetermined time before the next SSM 540 is expected. The timing error detection circuit 350 is then enabled, and if the timing is nominal, will reach a count of 0 when the next SSM 540 of servo field 532 is detected. This forces the program counter 352 to location 0. If, however, the timing error exceeds the value in the timing limit register, an interrupt may be generated to the microcontroller 188. The microcontroller 188 may then read the timing error register and add this value to the nominal delay that has been programmed into the SMS I RAM 332 for the delay counter 360. In order to do this, the microcontroller 188 must access the SMS I RAM 332 during operation to modify the location containing the nominal delay value. This process allows the servo PLL to be updated within one servo sample time.

Referring now to FIG. 10, the servo decoder 124 is shown in greater detail and like structure to that above described with respect to FIGS. 8A, 8B, 8C and 9 is like numbered and the foregoing description thereof shall suffice therefor.

The servo decoder 124 comprises a servo digital PLL synchronizer 390, a serial shift register ("SSR") 404, a SAM/SSM detection circuit 410, an external data circuit 396, a transition pattern decoder 406, a track number register 416, a transition pattern decoder 420 and index mark detector 418.

Inputs to servo digital PLL synchronizer 390 are supplied on a servo clock line 392 and a servo data line 394, the latter of which is also supplied as an input to the external data circuit 396. The external data circuit 396 has as an additional input, a BYPASS signal on line 398. Outputs from servo digital PLL synchronizer 390 appear on a cell line 400 and cell clock line 402 for input to the serial shift register 404 and the transition pattern decoder 406. The transition pattern decoder 406 has as an additional input, the output of SAM/SSM detection circuit 410 in the form of the SSM Fnd signal 346. The output of SSR 404 is supplied on a signal line 408 to SAM/SSM detection circuit 410, which also receives the additional input of an enable SSM search signal on line 344.

The outputs of transition pattern decoder 406 appear as Gray code data on line 422 and a Gray code clock signal on line 424. The signals at 422 and 424 are applied to a track number decoder 420 which has as its output, track number data for input to track number register 416. The register 416 is also coupled to an output of the external data circuit 396. The signals appearing on lines 422 and 424 are also supplied as inputs to index mark detector 418. The index mark detector 418 provides an index mark found signal on line 426 in response to finding an index mark.

The servo decoder 124 is responsible for detection of the SAM 538, SSM 540, index 542, and Gray code 544. The servo decoder 124 is initiated by the servo microsequencer 126 to search for a valid SSM 540. The majority voter circuit previously described is used to detect the SAM 538. The majority voter is therefore used primarily for ignoring drop-ins during SAM 538 detection. After the SAM 538 is detected, a search for the SSM 540 begins. The SSM 540 length, pattern and vote threshold are all programmable via the servo synch mark configuration register.

Posting a valid SSM 540 detection results in a branch to location 0 of SMS I RAM 332. The servo microsequencer 126 then executes from the code sequence at the beginning of SMS I RAM 332, which should be a delay routine to post a window over the first servo field 530, when the servo microsequencer 126 controls the sampling and conversion of the off-track bursts 546. The servo decoder 124 continues to search for the index mark 542 and then the Gray coded track number.

All timing intervals for the servo decoder 124 are derived from servo data signal on the line 394. The cell is the basic timing unit for windowing and shifting data into the majority vote detector and for detection of both the SAM 538 and the SSM 540. Cells are integral multiples of servo clock periods. The width of a cell is programmable by the cell clock count. The servo digital PLL synchronizer 390 controls the synchronization of the incoming data stream. The minimum width of a cell is two servo clocks. When a resynchronization occurs on a transition, the transition is centered on a cell.

The SSR 404 is a 16 bit shift register used to capture the incoming data stream while the SAM/SSM detection logic 410 actually detects the encoded transition. The heart of this logic block is a majority voter circuit with programmable thresholds. A SAM 538 is detected if the minimum number of detected bits match with the SAM 538 template. Since the SAM 538 may consist of either one or two servo address fields, each field must match (if two are specified). SSM 540 detection is similar.

External data circuit 396 is used to stream a track number identification directly into the track number register 416, and bypass the decode logic of the servo decoder.

The transition pattern decoder 406 converts synchronized raw channel data into a form that the track number decoder 420 can use, namely a Gray code clock (gc_clock) signal on line 422 and a Gray code data (gc_data) signal on line 424. The transition pattern decoder 406 also posts an error flag into the track number register 416 if a decoder violation occurred. The track number decoder 420 does the actual decoding of the signals 422 and 424 into a form that can be loaded into the track number register 416. The index mark detector 418 detects the mark in the index 542 of the servo field 530.

With reference to FIG. 11, the state transitions of the servo decoder 124 during the SAM 538 and SSM 540 detection process are shown. Initialization and control of the servo decoder 124 is accomplished through the microcontroller register 334 (as shown in FIG. 10).

As previously described, the servo address mark ("SAM") 538 is detected with a majority voter circuit. Upon initialization, the input shift register is forced high, and the SAM 538 target bit register is compared against all logical highs. The data is shifted into a shift register and the outputs of the target bit register and the shift register are compared and tallied. The tally is compared against a pre-programmed threshold. If the tally is equal to or exceeds the threshold, a valid SAF is detected. If the user programs only one SAF per SAM 538, then a valid SAM 538 is detected, and the state machine begins looking for the SSM 540. If the user programs two SAF per SAM 538, then the state machine searches for two contiguous, identical SAF's before posting a valid SAM 538.

Upon initialization of servo decoder 124, an asynch reset signal 440 causes servo decoder 124 to enter a wait state ("S0") 442. A threshold not met indication 444 causes a loop at state 0 442, but a threshold met indication 446 causes a transition to either state 1 ("S1") 448, state 2 ("S$_2$") 454, or state 3 ("S3") 460, depending on whether only one servo address field per SAM 538 or two servo address fields per SAM 538 are programmed. For example, at state 1 448, if two SAF's are specified for each SAM 538, a loop 450 at state 1 448 occurs until the first SAF is detected and indication 452 is produced. In like manner, if two SAF's are defined for each SAM 538, state 2 454 will be entered and a loop 456 at state 2 occurs until a threshold met 458 indication is produced. After detection of the SAM or alternatively, should the detection of no SAM 538 have been programmed, the servo decoder 124 will transition from state 0 442 directly to state 3 460 for detection of the servo synch mark. If the threshold is not met, a loop 462 will occur at state 3 until a threshold met 464 indication is produced upon detection of the SSM 540, at which time, at state 4 346, an SSM fnd 346 signal will be output from servo decoder 124 to the servo microsequencer 126.

While there have been described above the principles of the invention in conjunction with specific apparatus, it is to be clearly understood that the foregoing description is made only by way of example and not as a limitation to the scope of the invention.

The invention claimed is:

1. An integrated circuit for controlling a computer mass storage device, said storage device including a spindle motor for controllably rotating a storage media and an actuator for controllably positioning a data transducer with respect to said storage media in response to actuator analog control signals to sense encoded data arranged along a plurality of generally concentric data tracks, each said data track having information data sectors between which servo data sectors are positioned, said data transducer supplying analog transducer output signals related to the encoded data of a data track relative to which said data transducer is positioned, said integrated circuit comprising:

a servo subsystem adapted to be connected to said data transducer for detecting said encoded data of said servo data sectors from said transducer output signals and for creating a servo control signal in response to said encoded data of said servo data sectors;

an analog-to-digital subsystem contracted to said servo subsystem and adapted to be connected to said transducer to receive said transducer output signals and operative in response to said servo control signal for converting predetermined transducer output signals corresponding to said encoded data of said servo data sectors into digital transducer position signals representative of a relative position of said data transducer with respect to said data tracks;

a data processing subsystem connected to said analog-to-digital subsystem and operative in response to said digital transducer position signals for processing said digital transducer position signals in to digital motion control signals, said data processing subsystem further supplying selective control signals to the analog-to-digital subsystem to control selectively the converting of the predetermined transducer output signals into said digital transducer position signals; and a digital-to-analog subsystem connected to said data processing subsystem and adapted to be connected to said actuator, said digital-to-analog subsystem operative in response to said digital motion control signals for converting said digital motion control signals into said actuator analog control signals and applying said actuator analog control signals to said actuator to control the position said transducer; and wherein:

said analog-to-digital subsystem further comprises a multiplexer receptive of a plurality of transducer output signals from said data transducer and an analog-to-digital converter for converting said analog transducer output signals to digital components of said digital position signals, said multiplexer applying selected ones of said analog transducer output signals to said analog-to-digital converter for conversion in a predetermined sequence in response to the occurrence of said servo control signal and without the application of said selective control signals supplied from said data processing subsystem.

2. The integrated circuit of claim 1 wherein said encoded data from said servo data sectors includes encoded data indicative of a servo synchronization mark, and said servo subsystem comprises:

a servo decoder connected to receive transducer output signals corresponding to said encoded data indicative of said servo synchronization mark and operatively creates a servo synchronization mark signal in response to transducer output signals corresponding to said encoded data of said servo data sectors indicative of said servo synchronization mark; and a servo microsequencer connected to said servo decoder to receive said servo synchronization mark signal, said servo microsequencer responding to said servo synchronization mark signal to create said servo control signal and supply said servo control signal to said analog-to-digital subsystem.

3. The integrated circuit of claim 1 wherein said analog-to-digital subsystem further comprises:

an analog-to-digital sequencer connected to said analog-to-digital converter and responsive to said servo control signal for assembling said digital components into said digital transducer position signals without control from said data processing subsystem.

4. The integrated circuit of claim 3 wherein:

said analog-to-digital subsystem further comprises a plurality of registers connected to said analog-to-digital sequencer and operative for receiving and storing the digital transducer position signals assembled by said analog-to-digital sequencer; and said analog-to-digital sequencer controls said registers to receive and store said digital transducer position signals without control from said data processing subsystem.

5. The integrated circuit of claim 3 wherein said encoded data from said servo data sectors includes encoded data indicative of a predetermined plurality of off-track positions, and wherein:

said analog-to-digital sequencer assembles said digital components corresponding to said plurality of off-track positions into a plurality of off-track digital position signals; and said analog-to-digital subsystem further comprises a burst magnitude comparator connected to said analog-to-digital sequencer and operative for comparing said plurality of off-track digital position signals and selecting ones of said off-track digital position signals for processing by said data processing subsystem into said digital motion control signals, said burst magnitude comparator comparing and selecting said off-track digital position signals without control from said data processing subsystem.

6. The integrated circuit of claim 1 wherein said data processing subsystem comprises:

a digital signal processor responsive to said digital transducer position signals and operative to process said digital transducer position signals into said digital motion control signals; and random access memory connected to said digital signal processor for storing said digital transducer position signals prior to processing by said digital signal processor and for storing said digital motion control signals after processing by said digital signal processor.

7. The integrated circuit of claim 6 wherein said random access memory further stores instructions for controlling said digital signal processor to process said digital position signals into said digital motion control signals.

8. The integrated circuit of claim 7 further comprising:

a data bus connecting said servo subsystem, said analog-to-digital subsystem, said data processing subsystem and said digital-to-analog subsystem by which to transfer signals between said subsystems connected by said data bus; and a monitor bus separate from said data bus, said monitor bus connecting said digital signal processor, said random access memory, said analog-to-digital subsystem and said digital-to-analog subsystem by which to monitor signals conducted between said subsystems connected by said monitor bus, said monitor bus monitoring signals without interfering with signals transferred between said subsystems on said data bus.

9. The integrated circuit of claim 8 wherein said digital signal processor, said random access memory, said analog-to-digital subsystem and said digital-to-analog subsystem are connected to said data bus internally within said integrated circuit.

10. The integrated circuit of claim 9 the element of the analog-to-digital to which the monitor bus is coupled is an analog-to-digital converter, and the element of wherein:

said digital-to-analog subsystem includes a digital-to-analog converter for converting said digital motion control signals into said analog control signals; and said monitor bus is connected to said multiplexer, said analog-to-digital converter, and said digital-to analog converter.

11. The integrated circuit of claim 1 wherein said spindle motor is controllable in response to motor analog control signals and wherein:

said digital-to-analog subsystem comprises a digital-to-analog converter receptive of said digital motion control signals for creating said analog control signals from said digital motion control signals, said digital motion control signals including both said motor analog control signals and said actuator analog control signals.

12. The integrated circuit of claim 1 wherein said data tracks further include encoded data defining a sector mark which describes a relationship thereto of one said information data sector, said integrated circuit further comprising:

a sector mark generator connected to said servo subsystem and responsive to transducer output signals corresponding to said encoded data defining said sector mark for generating a sector signal indicative of said data transducer to commence sensing said encoded data from said information data sector.

13. The integrated circuit of claim 1 wherein:

said data processing subsystem supplies a system clock signal; and further comprising:

a timer circuit connected to said subsystems of said integrated circuit, said timer circuit generating interrupt control signals to said subsystems of said integrated circuit in synchronization with and after a predetermined number of system clock signals of said data processing subsystem, said predetermined number of system clock signals after which said interrupt signal is generated is selective in response to interrupt selection signals supplied by said data processing subsystem to said timer circuit.

14. The integrated circuit of claim 1 further comprising:

an interface located at an exterior of said integrated circuit and connected internally within said integrated circuit to said data processing subsystem for transferring data between an external microcontroller connected to said interface and said data processing subsystem.

15. The integrated circuit of claim 1 further comprising:

a serial input/output port located at an exterior of said integrated circuit and connected internally within said integrated circuit to said data processing subsystem for synchronous transfer of data between said integrated circuit and an external device connected to said serial port.

16. The integrated circuit of claim 1 further comprising:
a parallel input/output port located at an exterior of said integrated circuit and connected internally within said integrated circuit to said servo and data processing subsystems and operatively controlled by said servo and data processing systems for communicating data with an external device connected to said parallel port.

17. The integrated circuit of claim 1 further comprising:
a pre-driver subsystem adapted to be connected to said digital-to-analog subsystem and operative for receiving and amplifying said actuator analog control signals from said digital-to-analog subsystem and applying said amplified analog control signals to said actuator.

18. The integrated circuit of claim 1 wherein said spindle motor is controllable in response to motor analog control signals, and further comprising:
a pre-driver subsystem connected to said digital-to-analog subsystem and operative for receiving and amplifying said analog control signals from said digital-to-analog subsystem and applying said amplified analog control signals as motor analog control signals to said spindle motor.

19. The integrated circuit of claim 1 further comprising:
a motor control subsystem adapted to be connected to said storage device and operative for sensing a predetermined rotational condition of said spindle motor and for creating a spin control signal and supplying said spin control signal to said data processing subsystem in response to the existence of said predetermined rotational condition.

20. The integrated circuit of claim 19 wherein said motor control subsystem further comprises:
an undervoltage detection circuit for sensing an undervoltage condition of a voltage applied to said integrated circuit and operative for creating a park control signal and supplying said part control signal to said data processing subsystem in response to the existence of said undervoltage condition.

21. The integrated circuit of claim 20 wherein said data processing subsystem provides a digital motion control signal to said digital-to-analog subsystem which results in a corresponding analog control signal to move said actuator to a park position in response to said park control signal received from said undervoltage detection circuit.

22. A monolithic integrated circuit system for connection to and control of a computer mass storage disk drive, said disk drive including a spindle motor for controllably rotating a magnetic disk and an actuator for controllably positioning a read/write head with respect to said magnetic disk to sense encoded data arranged along a plurality of generally concentric data tracks having servo data sectors and information data sectors, said read/write head supplying transducer output signals corresponding to said encoded data sensed, said monolithic integrated circuit comprising:

detecting means adapted to be connected to said read/write head for detecting said encoded data of said servo data sectors from said transducer output signals and for supplying a detection control signal in response to the detection of said encoded data from said servo data sectors;

converting means adapted to be connected to receive transducer output signals from said read/write head and connected to said detecting means and operative in response to said detection control signal for converting said encoded data from said servo data sectors to digital transducer position signals, said digital transducer position signals corresponding to said transducer output signals from said transducer relative to a position of said read/write head with respect to said data tracks;

processing means connected to said converting means for processing said digital transducer position signals and for creating digital motion control signals in response to said digital transducer position signals, said processing means further supplying selective control signals to said converting means to control selectively the converting of said encoded data into said digital transducer position signals; and control means connected to said processing means and adapted to be connected to said spindle motor and said actuator, said control means creating actuator control signals and applying said actuator control signals to said actuator and to said spindle motor in response to said digital motion control signals to control the position and the rotation of said actuator and said spindle motor, respectively, and wherein:

said converting means further comprises multiplexer means receptive of a plurality of transducer output signals from said read/write head and an analog-to-digital converter for converting said analog transducer output signals to said digital position signals, said multiplexer applying selected ones of said analog transducer output signals to said analog-to-digital converter for conversion in a predetermined sequence in response to the occurrence of said detection control signal and without the application of said selective control signals.

23. A system for controlling a computer mass storage device and communicating signals between an external host processor and said storage device, said storage device including a spindle motor for controllably rotating a storage media and an actuator for controllably positioning a data transducer with respect to said storage media to sense encoded data configured in information data sectors arranged along a plurality of generally concentric data tracks having servo data sectors between said information data sectors, said data transducer supplying analog transducer output signals related to the encoded data of a data track relative to which said data transducer is positioned, said system comprising:

a first integrated circuit adapted to be connected to said data transducer for decoding said encoded data from said transducer output signals and producing information data signals corresponding to said encoded data from said information data sectors;

a second integrated circuit connected to said first integrated circuit for controllably interfacing said system to said external host processor and transferring said information data signals between said system and said host processor; and a third integrated circuit connected to said first and second integrated circuits and adapted to be connected to said storage device for controlling said spindle motor and said actuator to selectively position said data transducer with respect to said data tracks of said data storage media to read said encoded data of said information data sectors in response to external control signals supplied from said external host processor, wherein said third integrated circuit comprises:

a servo subsystem connected to said first integrated circuit for detecting said encoded data of said servo data sectors and providing a detection control signal in response thereto:

an analog-to-digital subsystem connected to said first integrated circuit and receptive of said transducer output signals, said analog-to-digital subsystem operative in response to said detection control signal for converting transducer output signals corresponding to encoded data of said servo data sectors in a predetermined sequence and assembling the sequence of converted transducer output signals into digital transducer position signals representative of a position of said data transducer with respect to said data tracks;

a data processing subsystem coupled to said analog-to-digital subsystem for processing said digital transducer position signals and providing digital motion control signals related to said digital transducer position signals, said data processing subsystem further supplying selective control signals to the analog-to-digital subsystem to control selectively the converting of said transducer output signals into said digital transducer position signals; and a digital-to-analog subsystem connected to said data processing subsystem and receptive of said digital motion control signals for providing analog control signals to said actuator related to said digital motion control signals to control the position of said actuator and transducer; and wherein:

said analog-to-digital subsystem converting and assembling the predetermined sequence of transducer output signals into the digital motion control signals upon the occurrence of and in response to said detection control signal and without the application of either said external control signals supplied from said external host processor or said selective control signals from said data processing subsystem; and said analog-to-digital subsystem further including a comparator for comparing a plurality of converted transducer output signals and selecting at least two converted transducer output signals to supply as the digital transducer position signals to said data processing subsystem.

24. The system of claim 23 wherein said encoded data from said servo data sectors includes encoded data indicative of a servo synchronization mark, and said servo subsystem comprises:

a servo decoder connected to receive transducer output signals corresponding to said encoded data indicative of said servo synchronization mark and operatively creates a servo synchronization mark signal in response to transducer output signals corresponding to said encoded data of said servo data sectors indicative of said servo synchronization mark; and a servo microsequencer connected to said servo decoder to receive said servo synchronization mark signal, said servo microsequencer responding to said servo synchronization mark signal to create said servo control signal and supply said servo control signal to said analog-to-digital subsystem.

25. The system of claim 23 wherein said analog-to-digital subsystem further comprises:

an analog-to-digital sequencer connected to said analog-to-digital converter and responsive to said servo control signal for assembling said digital components into said digital transducer position signals without control from said data processing subsystem.

26. The system of claim 25 wherein:

said analog-to-digital subsystem further comprises a plurality of registers connected to said analog-to-digital sequencer and operative for receiving and storing the digital transducer position signals assembled by said analog-to-digital sequencer; and said analog-to-digital sequencer controls said registers to receive and store said digital transducer position signals without control from said data processing subsystem.

27. The system of claim 25 wherein said encoded data from said servo data sectors includes encoded data indicative of a predetermined plurality of off-track positions, and wherein:

said analog-to-digital sequencer assembles said digital components corresponding to said plurality of off-track positions into a plurality of off-track digital position signals; and said analog-to-digital subsystem further comprises a burst magnitude comparator connected to said analog-to-digital sequencer and operative for comparing said plurality of off-track digital position signals and selecting ones of said off-track digital position signals for processing by said data processing subsystem into said digital motion control signals, said burst magnitude comparator comparing and selecting said off-track digital position signals without control from said data processing subsystem.

28. The system of claim 23 wherein said data processing subsystem comprises:

a digital signal processor responsive to said digital transducer position signals and operative to process said digital transducer position signals into said digital motion control signals; and random access memory connected to said digital signal processor for storing said digital transducer position signals prior to processing by said digital signal processor and for storing said digital motion control signals after processing by said digital signal processor.

29. The system of claim 28 wherein said random access memory further stores instructions for controlling said digital signal processor to process said digital position signals into said digital motion control signals.

30. The system of claim 29 further comprising:

a data bus connecting said servo subsystem, said analog-to-digital subsystem, said data processing subsystem and said digital-to-analog subsystem by which to transfer signals between said subsystems connected by said data bus; and a monitor bus separate from said data bus, said monitor bus connecting said digital signal processor, said random access memory, said analog-to-digital subsystem and said digital-to-analog subsystem by which to monitor signals conducted between said subsystems connected by said monitor bus, said monitor bus monitoring signals without interfering with signals transferred between said subsystems on said data bus.

31. The system of claim 30 said digital signal processor, said random access memory, said analog-to-digital subsystem and said digital-to-analog subsystem are connected to said data bus internally within said third integrated circuit.

32. The system of claim 31 wherein:

said digital-to-analog subsystem includes a digital-to-analog converter for converting said digital motion control signals into said analog control signals; and said monitor bus is connected to said multiplexer, said analog-to-digital converter, and said digital-to analog converter.

33. The system of claim 23 wherein said spindle motor is controllable in response to motor analog control signals and wherein:

said digital-to-analog subsystem comprises a digital-to-analog converter receptive of said digital motion control signals for creating said analog control signals from said digital motion control signals, said digital motion control signals including both said motor analog control signals and said actuator analog control signals.

34. The system of claim 23 further comprising:

a data bus connecting said servo subsystem, said analog-to-digital subsystem, said data processing subsystem and said digital-to-analog subsystem by which to transfer signals between said subsystems connected by said data bus.

35. The system of claim 23 wherein said data tracks further include encoded data defining a sector mark which describes a relationship thereto of one said information data sector, said third integrated circuit further comprising:

a sector mark generator connected to said servo subsystem and responsive to transducer output signals corresponding to said encoded data defining said sector mark for generating a sector pulse indicative of said data transducer to commence sensing said encoded data from said information data sector.

36. The system of claim 23 wherein:

said data processing subsystem supplies a system clock signal; and further comprising:

a timer circuit connected to said subsystems of said third integrated circuit, said timer circuit generating interrupt control signals to said subsystems of said third integrated circuit in synchronization with and after a predetermined number of system clock signals of said data processing subsystem, said predetermined number of system clock signals after which said interrupt signal is generated is selective in response to interrupt selection signals supplied by said data processing subsystem to said timer circuit.

37. The system of claim 23 further comprising:

an interface located at an exterior of said third integrated circuit and connected internally within said third integrated circuit to said data processing subsystem for transferring data between an external microcontroller connected to said interface and said data processing subsystem.

38. The system of claim 23 further comprising:

a serial input/output port located at an exterior of said third integrated circuit and connected internally within said third integrated circuit to said data processing subsystem for synchronous transfer of data between said third integrated circuit and an external device connected to said serial port.

39. The system of claim 23 further comprising:

a parallel input/output port located at an exterior of said third integrated circuit and connected internally within said third integrated circuit to said servo and data processing subsystems and operatively controlled by said servo and data processing systems for communicating data with an external device connected to said parallel port.

40. The system of claim 23 further comprising:

a pre-driver subsystem adapted to be connected to said digital-to-analog subsystem and operative for receiving and amplifying said actuator analog control signals from said digital-to-analog subsystem and applying said amplified analog control signals to said actuator.

41. The system of claim 23 wherein said spindle motor is controllable in response to motor analog control signals, and further comprising:

a pre-driver subsystem connected to said digital-to-analog subsystem and operative for receiving and amplifying said analog control signals from said digital-to-analog subsystem and applying said amplified analog control signals as motor analog control signals to said spindle motor.

42. The system of claim 23 wherein said third integrated circuit further comprises:

a motor control subsystem adapted to be connected to said storage device and operative for sensing a predetermined rotational condition of said spindle motor and for creating a spin control signal and supplying said spin control signal to said data processing subsystem in response to the existence of said predetermined rotational condition.

43. The system of claim 42 wherein said motor control subsystem further comprises:

an undervoltage detection circuit for sensing an undervoltage condition of a voltage applied to said third integrated circuit and operative for creating a park control signal and supplying said part control signal to said data processing subsystem in response to the existence of said undervoltage condition.

44. The system of claim 43 wherein said data processing subsystem provides a digital motion control signal to said digital-to-analog subsystem which results in a corresponding analog control signal to move said actuator to a park position in response to said park control signal received from said undervoltage detection circuit.

45. A method of using a single integrated circuit for controlling a computer mass storage disk drive, said disk drive including a spindle motor for controllably rotating a magnetic disk and an actuator for controllably positioning at least one read/write head with respect to said magnetic disk to sense encoded data configured in information data sectors arranged along a plurality of generally concentric data tracks having servo data sectors between the information data sectors and to supply signals related to said encoded data sensed, said method comprising the steps of:

detecting said encoded data of said servo data sectors from signals supplied by said read/write head;

providing a detection control signal in response to said step of detecting;

converting encoded data of said servo data sectors to digital transducer position information representative of a position of said read/write head with respect to said data tracks solely in response to said step of providing said detection control signal;

supplying selective control signals from a digital signal processor to control the conversion of some of said encoded data the from said data sectors;

said converting step including the step of multiplexing a plurality of signals from said read/write head into a predetermined sequence to form said position information solely in response to the occurrence of said detection control signal;

said step of multiplexing said signals from said read/write head into said position information occurring without supplying said selective control signals to control the multiplexing of said signals from said read/write head;

processing said digital transducer position information;

generating digital motion control signals by steps including said step of processing; and controlling the position of said actuator in response to said digital motion control signals.

46. An integrated circuit for controlling a computer disk drive device, said device including a spindle motor for controllably rotating a storage disk and an actuator for controllably positioning a data transducer with respect to said storage disk to sense encoded data configured in information data sectors arranged along a plurality of generally concentric data tracks having servo data sectors between said information data sectors, said integrated circuit comprising:

a servo subsystem adapted to be connected to said data transducer for detecting said encoded data of said servo data sectors from said transducer output signals and for creating a servo control signal in response to said encoded data of said servo data sectors;

an analog-to-digital subsystem connected to said servo subsystem and adapted to be connected to said transducer to receive said transducer output signals and operative in response to said servo control signal for converting predetermined transducer output signals corresponding to said encoded data of said servo data sectors into digital transducer position signals representative of a relative position of said data transducer with respect to said data tracks, said analog-to-digital subsystem including an analog-to-digital converter receptive of said transducer output signals for producing digital signals representative of said encoded data of said servo data sectors and representative of the position of said data transducer relative to said data tracks;

a data processing subsystem connected to said analog-to-digital subsystem and operative in response to said digital signals for processing said digital signals representative of the position of said transducer relative to said data tracks and creating digital motion control signals in response to said digital signals representative of the position of said data transducer and creating digital spindle control signals in response to other said digital signals, said data processing subsystem further comprising a digital signal processor and an instruction random access memory for storing instruction information for operatively controlling said digital signal processor;

a digital-to-analog subsystem connected to said data processing subsystem and adapted to be connected to said actuator, said digital-to-analog subsystem operative in response to said digital motion control signals for converting said digital motion control signals into said analog control signals and applying said analog control signals to said actuator to control the position said transducer, said digital-to-analog subsystem also operative in response to said digital spindle control signals for converting said digital spindle control signals into said analog control signals and applying said analog control signals to said spindle motor to control the rotation of said storage disk, said digital-to-analog subsystem further comprising a digital-to-analog converter responsive to said digital control signals for creating said analog control signals for said spindle motor and said actuator;

a data bus connecting said servo subsystem, said analog-to-digital subsystem, said data processing subsystem and said digital-to-analog subsystem by which to communicate operational signals to achieve interoperability of said servo subsystem, said analog-to-digital subsystem, said data processing subsystem and said digital-to-analog subsystem in said integrated circuit; and a monitor bus separate from said data bus, said monitor bus connecting said digital signal processor, said data random access memory, said instruction random access memory, said analog-to-digital converter and said digital-to-analog converter internally within said integrated circuit by which to monitor signals applied from and to said digital signal processor, said instruction random access memory, said analog-to-digital converter and said digital-to-analog converter independently of and without interfering with said operational signals present on said data bus.

47. An integrated circuit for controlling a computer mass storage device, said storage device including a spindle motor for controllably rotating a storage media and an actuator for controllably positioning a data transducer with respect to said storage media to sense encoded data configured in information data sectors arranged along a plurality of generally concentric data tracks having servo data sectors between said information data sectors, said data transducer supplying analog transducer output signals related to the encoded data of a data track relative to which said data transducer is positioned, said integrated circuit comprising:

a servo subsystem adapted to be connected to said data transducer and receptive of said transducer output signals for detecting encoded data of said servo data sectors and creating a detection control signal in response to the detected encoded data;

an analog-to-digital subsystem adapted to be connected to said data transducer and receptive of said transducer output signals, said analog-to-digital subsystem responding to said detection control signal to convert encoded data of said servo data sectors to digital transducer position signals representative of a position of said data transducer with respect to said data tracks; and a data processing subsystem connected to said analog-to-digital subsystem for processing said digital transducer position signals and providing digital motion control signals in response to the processing of said digital transducer position signals, said data processing subsystem further supplying selective control signals to said analog-to-digital subsystem to control selectively the converting of the encoded data to said digital transducer position signals; and wherein:

said analog-to-digital subsystem further includes a plurality of registers for storing said digital transducer position signals and a sequencer for transferring said digital transducer position signals to the registers for storage in a predetermined order in response to the occurrence of said detection control signal and without selective control signals supplied from said data processing subsystem.

* * * * *